United States Patent
Dopke et al.

(10) Patent No.: US 8,714,051 B2
(45) Date of Patent: May 6, 2014

(54) FLYWHEEL ASSEMBLY

(75) Inventors: Russell J. Dopke, Elkhart Lake, WI (US); Roger W. Albert, Plymouth, WI (US); Jonathan T. Bykowski, Shorewood, WI (US); Edward A. Uebelher, Oshkosh, WI (US)

(73) Assignee: Kohler Co., Kohler, WI (US)

( * ) Notice: Subject to any disclaimer, the term of this patent is extended or adjusted under 35 U.S.C. 154(b) by 1596 days.

(21) Appl. No.: 12/253,363

(22) Filed: Oct. 17, 2008

(65) Prior Publication Data

US 2009/0120401 A1    May 14, 2009

Related U.S. Application Data

(60) Provisional application No. 60/999,451, filed on Oct. 18, 2007.

(51) Int. Cl.
*F16H 33/02*    (2006.01)
*F16C 15/00*    (2006.01)

(52) U.S. Cl.
USPC ............. 74/572.21; 74/575.2; 123/192.1; 123/192.2

(58) Field of Classification Search
USPC ........... 123/192.1, 192.2; 74/572.2, 572.21
See application file for complete search history.

(56) References Cited

U.S. PATENT DOCUMENTS

| | | | |
|---|---|---|---|
| 2,932,447 A | | 4/1960 | Phelon |
| 3,843,188 A | * | 10/1974 | Kirschner .................. 295/7 |
| 3,952,712 A | * | 4/1976 | Hermanson ............... 123/41.65 |
| 4,176,563 A | * | 12/1979 | Younger ..................... 74/572.2 |
| 4,492,131 A | * | 1/1985 | Auer ........................... 74/574.2 |
| 5,755,194 A | * | 5/1998 | Moorman et al. ....... 123/196 W |
| 5,927,678 A | * | 7/1999 | Parr ............................. 248/559 |
| 7,134,361 B2 | * | 11/2006 | Ninomiya et al. ......... 74/572.21 |
| 7,150,207 B2 | * | 12/2006 | Jackel et al. ................ 74/572.2 |
| 7,232,017 B2 | * | 6/2007 | Minor ........................... 188/378 |
| 8,117,943 B2 | * | 2/2012 | Manzoor ..................... 74/574.4 |
| 2004/0045399 A1 | * | 3/2004 | Hadi .............................. 74/574 |
| 2008/0174166 A1 | * | 7/2008 | Kalil ............................ 301/5.1 |

FOREIGN PATENT DOCUMENTS

FR        816886 A       8/1937

* cited by examiner

*Primary Examiner* — Noah Kamen
*Assistant Examiner* — Grant Moubry
(74) *Attorney, Agent, or Firm* — Whyte Hirschboeck Dudek S.C.

(57) ABSTRACT

A system for a flywheel assembly for use in conjunction with an internal combustion engine is disclosed. The flywheel assembly includes a flywheel in rotational association with a crankshaft of the internal combustion engine. The flywheel assembly further includes a cooling fan mounted over the flywheel, and capable of rotation therewith. The cooling fan and the flywheel are secured in a constant axial position relative to the crankshaft by virtue of a drive-cup and a retaining nut. Further, the flywheel includes a plurality of integrally formed, intersecting support ribs, for providing excellent dynamic stiffening (e.g., damping) capabilities to the flywheel assembly for substantially reducing and/or eliminating radiated noise.

14 Claims, 19 Drawing Sheets

FLYWHEEL ASSEMBLY

CROSS-REFERENCE TO RELATED APPLICATIONS

This application claims the benefit of U.S. provisional patent application No. 60/999,451 entitled "flywheel assembly" filed on Oct. 18, 2007, the entirety of which is hereby incorporated by reference herein.

FIELD OF THE INVENTION

The present invention relates to a flywheel assembly and, more particularly, to a flywheel assembly used in conjunction with a crankshaft of an internal combustion engine.

BACKGROUND OF THE INVENTION

Flywheel assemblies are used in a wide variety of applications including, for example, satellite pointing operations, automobiles, telecommunication industry and even some electrification systems. Frequently, flywheel assemblies are mounted for rotation on a crankshaft of an internal combustion engine. Often times, high speed rotation of the engine produce vibrations that can propagate through the crankshaft and out to the flywheel assembly and be radiated as a component of the engine noise. Such vibrations or noises are often undesirable or otherwise objectionable.

To minimize or possibly even completely eliminate such undesirable/objectionable vibrations and/or noises, many flywheel assemblies employ a damper or a damping mechanism for absorbing and damping vibrations and therefore, a portion of the overall noise. Often, such damping mechanisms are employed in between the crankshaft and the flywheel. Although adequate in most regards, such damping mechanisms are nevertheless inadequate in at least some circumstances. For example, damping mechanisms connected at least indirectly to the flywheel can add to the overall weight of the flywheel, making the flywheel less desirable for internal combustion engines used in applications requiring portability or otherwise having weight restrictions. Additionally, external damping mechanisms are susceptible to damage and break-down, rendering the damping mechanism and the flywheel to which it is connected, inefficient or possibly even completely incapable of being used.

It would therefore be advantageous if a flywheel assembly having a more efficient vibration suppression/prevention mechanism is developed. It would further be advantageous if such a damping mechanism is not external or otherwise connected externally to the flywheel, but rather is incorporated into the flywheel structure. Still further, it would be advantageous if a damping mechanism that does not add significantly to the weight of the flywheel is developed.

SUMMARY OF THE INVENTION

In one aspect, the present invention relates to a flywheel having a flywheel body for rotational association with a crankshaft of an internal combustion engine. The flywheel body includes an inner hub portion and an outer rim portion. In addition, the flywheel body includes a plurality of support ribs extending from the inner hub portion to the outer rim portion. The plurality of support ribs additionally reduces and/or eliminates the axial vibrations of the flywheel, which is a main mode of noise radiation from the flywheel. A conduit, for reducing and/or eliminating torsional vibrations, and formed in the flywheel body between or substantially between the support ribs is also provided.

In another aspect, the invention relates to a flywheel assembly contemplated for use in conjunction with an internal combustion engine. The flywheel assembly is mounted over a crankshaft of the internal combustion engine, for rotation in synchronism therewith. The flywheel assembly of the present invention includes a flywheel mounted over the crankshaft and a cooling fan in rotatable association with the flywheel. The flywheel and the cooling fan are further held in a constant position relative to the crankshaft by way of a fastening mechanism including a drive-cup and a retaining nut.

In yet another aspect, the present invention provides a system comprising a flywheel assembly and a crankcase of an internal combustion engine, the crankcase further having a crankshaft. The flywheel assembly is mounted to the crankshaft for rotation. Further, the flywheel assembly includes a flywheel having a flywheel body, wherein the flywheel body further includes a plurality of support ribs integrally formed therein. The flywheel assembly further includes a cooling fan that is in rotational association with the flywheel. Also provided are a drive cup and a retaining nut for securing the cooling fan and the flywheel axially in position relative to the crankshaft.

In still another aspect, the present invention provides a method of reducing and/or eliminating vibrations of the flywheel. The method comprises providing a flywheel in rotational association with a crankshaft of an internal combustion engine, wherein the flywheel includes a flywheel body having a plurality of support ribs integrally formed therewithin. The method further comprises rotating the flywheel about the axis of the crankshaft such that the plurality of support ribs reduces or eliminates the axial vibrations of the flywheel, which is a main mode of noise radiation from the flywheel.

Other aspects and embodiments are contemplated and considered within the scope of the invention.

BRIEF DESCRIPTION OF THE DRAWINGS

Features of the present invention which are believed to be novel are set forth with particularity in the appended claims. Embodiments of the invention are disclosed with reference to the accompanying drawings and these embodiments are provided for illustrative purposes only. The invention is not limited in its application to the details of construction or the arrangement of the components illustrated in the drawings. Rather, the invention is capable of other embodiments and/or of being practiced or carried out in other various ways. The drawings illustrate a best mode presently contemplated for carrying out the invention. Like reference numerals are used to indicate like components. In the drawings:

DETAILED DESCRIPTION OF THE PREFERRED EMBODIMENT

Figure 1:
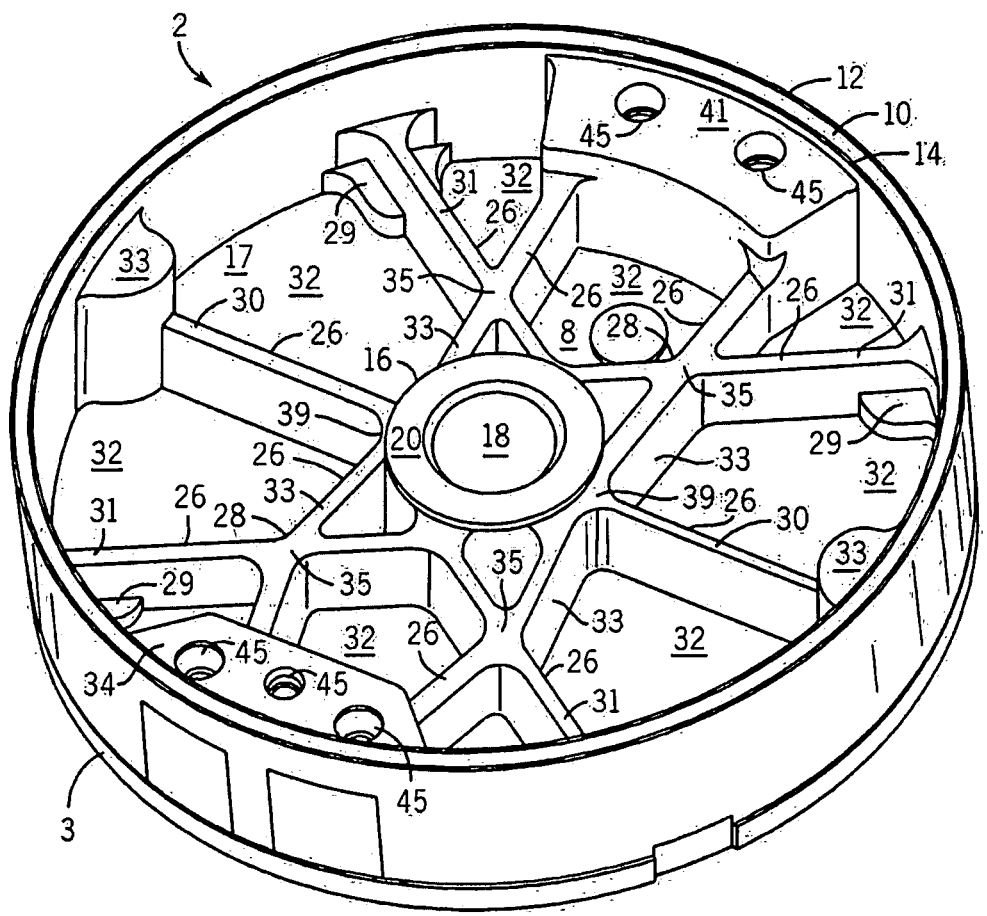
FIG. 1 is a perspective view of an underside surface of an exemplary flywheel in accordance with at least some embodiments of the present invention.
Figure 2:
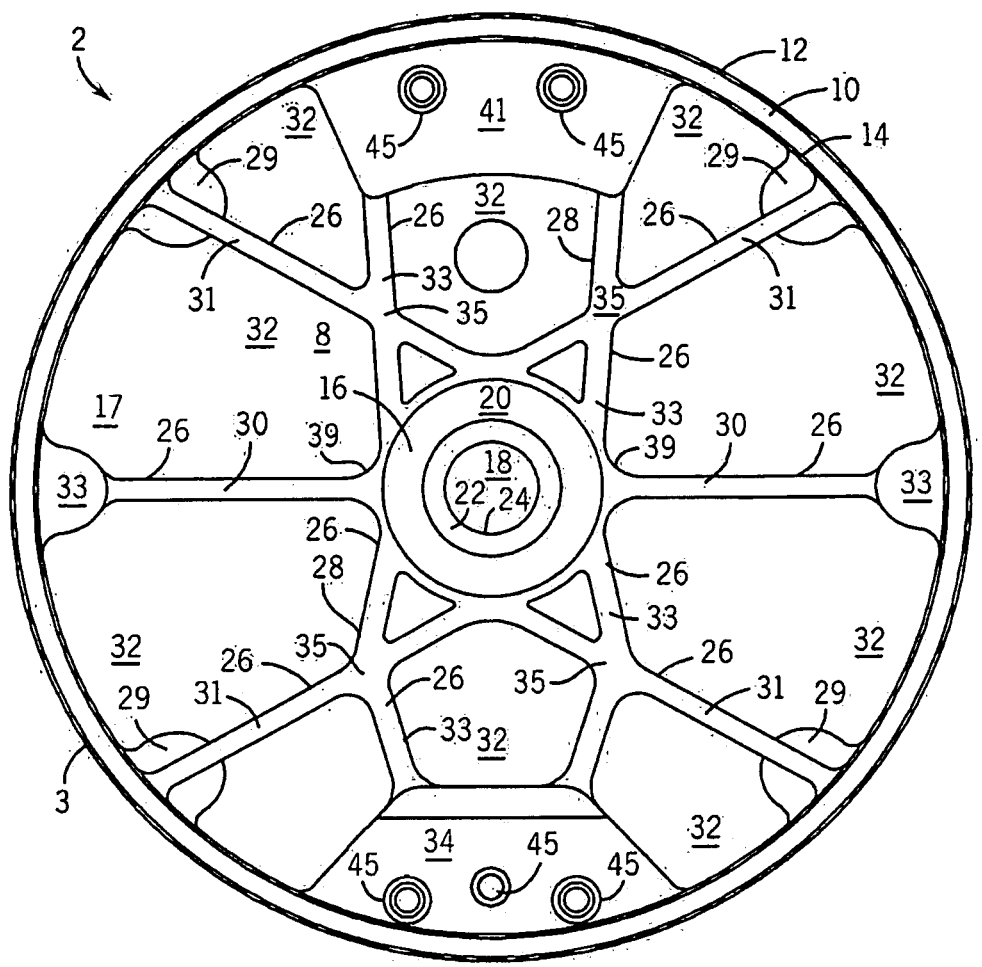
FIG. 2 is a top view of the flywheel of FIG. 1, in accordance with at least some embodiments of the present invention.

Referring to FIGS. 1 and 2, top perspective and top views, respectively, of an underside surface of an exemplary flywheel 2, are shown in accordance with at least some embodiments of the present invention. In at least some embodiments of the present invention, the flywheel 2 is intended for use in conjunction with an internal combustion engine (not shown). In particular, the internal combustion engine can be any of a wide variety of engines. For example, some embodiments of the present invention can be employed in conjunction with SORE engines including Class 1 and Class 2 small off-road engines such as those implemented in various machinery and vehicles, including, for example, lawn mowers, snow mobiles and the like. Indeed, in at least some embodiments, the present invention is intended to be applicable to "non-road engines" as defined in 40 C.F.R. §90.3, which states in pertinent part as follows: "Non-road engine means . . . any internal combustion engine: (i) in or on a piece of equipment that is self-propelled or serves a dual purpose by both propelling itself and performing another function (such as garden tractors, off-highway mobile cranes, and bulldozers); or (ii) in or on a piece of equipment that is intended to be propelled while performing its function (such as lawnmowers and string trimmers); or (iii) that, by itself or in or on a piece of equipment, is portable or transportable, meaning designed to be and capable of being carried or moved from one location to another. Indicia of transportability include, but are not limited to, wheels, skids, carrying handles, dolly, trailer, or platform."

Figure 5:
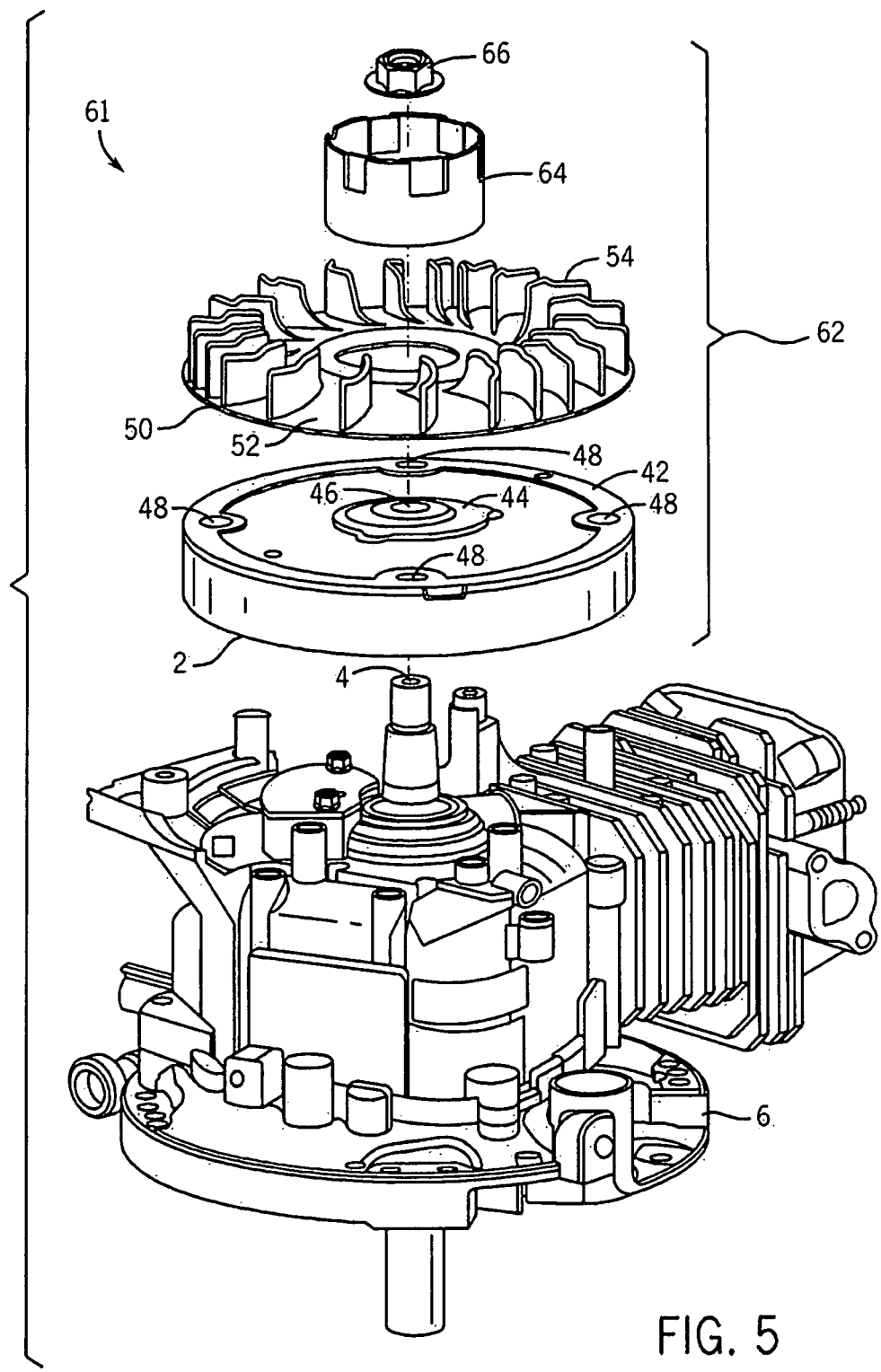
FIG. 5 is an exploded view of an exemplary flywheel assembly shown to include the flywheel of FIG. 1 and the cooling fan of FIG. 3, capable of being mounted on a crankshaft of a crankcase of an internal combustion engine, in accordance with at least some embodiments of the present invention.
Figure 6:
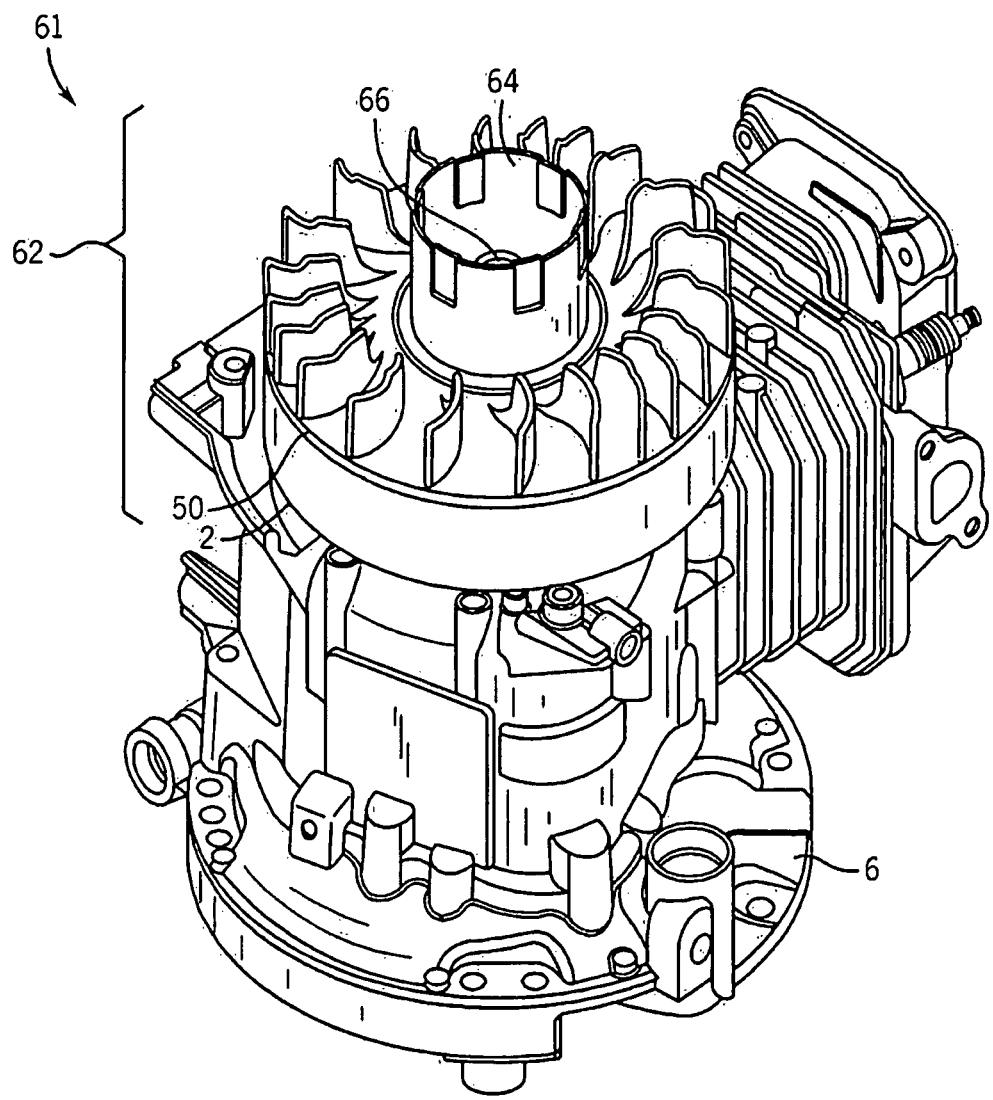
FIG. 6 is an assembled view of the flywheel assembly of FIG. 5, in accordance with at least some embodiments of the present invention.

The flywheel 2 of FIGS. 1 and 2 is part of a flywheel assembly 62, described in greater detail in FIGS. 5 and 6. The flywheel 2 in particular, is mounted for rotation over a central, tapered crankshaft 4 (See FIG. 5) of a crankcase 6 (See FIGS. 5 and 6) of the internal combustion engine. Additionally, the flywheel 2 is equipped with a damping (also referred herein as stiffening, or conduit) mechanism, for reducing noise and vibrations, produced due to the pulsating characteristics of the engine, which are transmitted through the crankshaft 4 and to the flywheel 2. Further, in the present embodiment, the flywheel 2 includes a solid, rigid, disk-shaped or substantially disk-shaped flywheel body 3, having a thickness that, during normal operation of the engine, on which the flywheel is mounted, experiences rotational movement with minimal or no axial movement.

In addition, in at least some embodiments of the present invention, the flywheel 2 is a single piece of construction, with all components (described below) integrally formed within the surface of the flywheel body 3. Generally, the flywheel 2 is made of a non-magnetic material such as aluminum, or a ferromagnetic material such as steel. Nevertheless, in other embodiments, different components of the flywheel 2 can be constructed separately (e.g., as separate or distinct components or parts), out of separate ferromagnetic and/or non-magnetic materials, and coupled together in operational association. In alternate embodiments, the flywheel 2, and components thereof, can be made out of ferromagnetic and/or non-magnetic materials other than those provided above, and potentially of magnetic materials as well.

As shown in FIGS. 1 and 2, the flywheel body 3 includes an inner portion 8 and an outer rim 10 abutting the inner portion, and integrally formed therewith. The outer rim 10 further includes an outer lip portion 12 and an inner lip portion 14. In at least some embodiments of the present invention, each of the outer and the inner lip portions 12 and 14, respectively, have a cylindrical surface that is machined to be aligned (e.g., parallel) with an axis shared by (and about which rotate), each of the flywheel 2, the outer rim 10, and the crankshaft 4. Additionally, the size of the flywheel 2 can vary from one embodiment to another. For example, in at least some embodiments of the present invention, the size of the flywheel 2 can be determined from a non-dimensionalized assembled thickness ratio of the outer rim 10. Typically, the non-dimensionalized assembled thickness ratio of an outer rim refers to a ratio of an inner diameter to an outer diameter of the outer rim.

For example, the non-dimensionalized assembled thickness ratio of the outer rim 10 of the present embodiment can be calculated by determining the ratio of the diameters of the inner lip portion 14 and the outer lip portion 12. Further, in at least some embodiments of the present invention, the non-dimensionalized assembled thickness ratio of the outer rim 10 can be greater than or about 0.8. Nevertheless, in other embodiments, depending upon the application of the internal combustion engine employing the flywheel 2, the non-dimensionalized assembled thickness ratio of the outer rim 10 can be less than or equal to 0.8.

With respect to the inner portion 8 of the flywheel body 3, the inner portion is further divided into an inner hub portion 16 for linking the flywheel for rotation with the crankshaft 4, and a surrounding outer body portion 17 extending up to the inner lip portion 14 of the outer rim 10. The inner hub portion 16 further includes an orifice 18, extending axially from a central or a substantially central portion thereof for receiving the crankshaft 4. The crankshaft 4, in particular, is a tapered shaft, continuously tapering from the crankcase 6 towards the outer end of the shaft. To provide a closely-fitted, self-fitting mechanism for securing the flywheel 2 relative to the crankshaft 4, the orifice 18 is a tapering orifice, which continuously tapers as the orifice extends from the underside surface of the flywheel 2 to the top surface (not shown) of the flywheel. The tapering of the orifice 18 can be clearly seen in FIG. 2, where the orifice 18 has a broader orifice portion 20 on the underside surface and a tapered orifice portion 22 on a top surface 42 (See FIG. 5) of the flywheel 2.

The flywheel 2 is mounted onto the crankshaft 4 by virtue of the tapering orifice 18 receiving the tapered crankshaft, and press-fitting the flywheel onto the crankshaft, providing the self-fitting mechanism. In addition to the tapering feature, the orifice 18 has a key-lock feature 24 (See FIG. 2) extending axially along the inner tapered portions of the orifice 18 for providing a close-fit along the entire periphery of the tapered orifice of the flywheel 2 and the crankshaft 4.

Referring still to FIGS. 1 and 2, the pulsating characteristics of the engine causes vibrations to be transmitted from the crankshaft 4 to the flywheel 2, with those vibrations being radiated from the flywheel in the form of noise. Insofar as such vibration/noise is undesirable and can otherwise be objectionable, a wide variety of dampers coupled to the flywheel are typically used. Often, such dampers add to the overall weight of the flywheel and cost of the engine. Further, such dampers, due to frictional interaction between the dampers and other moving components connected thereto, are increasingly susceptible to damage and malfunction.

Therefore, to avoid the disadvantages of a conventional damper and to damp undesirable vibrations/noises generated by the flywheel and rotation thereof about the crankshaft, the present invention provides a plurality of support ribs 26. In addition to reducing and/or eliminating noise, the support ribs 26 serve to minimize deflection, resonant response and mass of the flywheel 2. Particularly, the support ribs 26 extend between, and are integrally formed with, the inner hub portion 16 and the inner lip portion 14 of the outer rim 10. It shall be understood that terms that are used herein to describe structural and other features, such as "rim", "lip", "hub", and the like are intended to have a broad interpretation. For example, the word "rib" as used herein can include terms such as rib portion(s), rib segment(s), struts, rib mechanisms and other similar terms as appropriate. Further, the dimensions (e.g., height and width) of the support ribs 26 can vary to convenience depending upon the size and the weight of the flywheel 2.

Depending upon the positioning of the support ribs 26 relative to the inner hub portion 16, the support ribs can typically be divided into two types or classes. For example, the support ribs 26 can comprise tangential ribs, which are at a tangent, or at least substantially at a tangent, to the inner hub portion 16, and radial ribs, which are positioned radially about the inner hub portion. In at least some embodiments of the present invention, the support ribs 26 include a set of eight tangential ribs 28 and two radial ribs 30. The two radial ribs 30 are positioned diametrically opposite (e.g., at 180 degrees), or substantially opposite, to one another on the sides of the inner hub portion 16. In at least some embodiments of the present invention, and, as shown, the radial ribs 30 can extend radially or at least substantially radially from the inner hub portion 16 to a semi-cylindrical portion 33 of the flywheel body 3. In at least some other embodiments of the present invention, the radial ribs 30 can extend from the inner hub portion 16 to the inner lip portion 14 of the outer rim 10.

With respect to the tangential ribs, the eight tangential ribs 28 are further divided into two groups of four ribs each, with each group being placed diametrically opposite (or substantially opposite) to one another, and perpendicular or substantially perpendicular to the two radial ribs 30. The arrangement of each group of four ribs of the eight tangential ribs 28 relative to the inner hub portion 16 and the radial ribs 30 is described below. In particular, each group includes two outer ribs 31, positioned to form a V or substantially V-shaped configuration, extending from the inner hub portion 16 to the inner lip 14 of the outer rim 10. Additional reinforcement to the outer ribs 31 can be provided by way of bosses 29, which are integrally formed within the flywheel body 3. The bosses 29 typically extend to the other side (e.g., top surface 42) of the flywheel 2, where the bosses form holes for receiving additional components of the flywheel assembly 62, as will be described below. Also, the shape and size of the bosses 29 can vary from one embodiment to another.

Further, each group of the tangential ribs 28 includes two inner ribs 33 extending from sections 41 and 34, respectively, of the flywheel body 3, and further intersecting the two outer ribs 31 at an intersecting region 35. Additionally, the two inner ribs 33 are in mating alignment with the radial ribs 30 at a tangent to the inner hub portion 16 at another intersecting region 39, such that the two inner ribs 33 are perpendicular or substantially perpendicular to the radial ribs 30. Although an exemplary arrangement of the support ribs 26 is described above, in other embodiments, the arrangement of the ribs, and the number of ribs in each class (e.g., tangential and radial ribs) can vary to convenience. Additionally, while the eight tangential ribs 28 and the radial ribs 30, as described here, are discrete ribs intersecting one another at discrete intersecting regions (e.g., intersecting regions 35, 39), it is nevertheless an intention of this invention to include embodiments in which varying rib, rib portions and/or rib sections intersect, and thus are joined and/or connected with one another at one or more intersecting regions.

In general, the orientation and/or arrangement of the support ribs 26, as described above, reduces and/or eliminates vibrations and any associated noise by virtue of one or more of the support ribs 26 interacting with one another. For example, the V or substantially V-shaped outer tangential ribs 31 assist in reducing torsional vibrations by way of interaction (e.g., via the connection and/or location of the ribs) with one another. Specifically, the outer rib 31 in the upper left corner interacts with the outer rib 31 in the lower right corner and vice-versa for reducing and/or eliminating vibrations and noise. Relatedly, the outer rib 31 in the upper right corner interacts, and works in concert with the outer rib 31 in the lower left corner and vice versa. Similarly, the radial ribs 30 and the inner tangential ribs 33 work in tandem with one another for providing a damping mechanism.

Figure 2A:
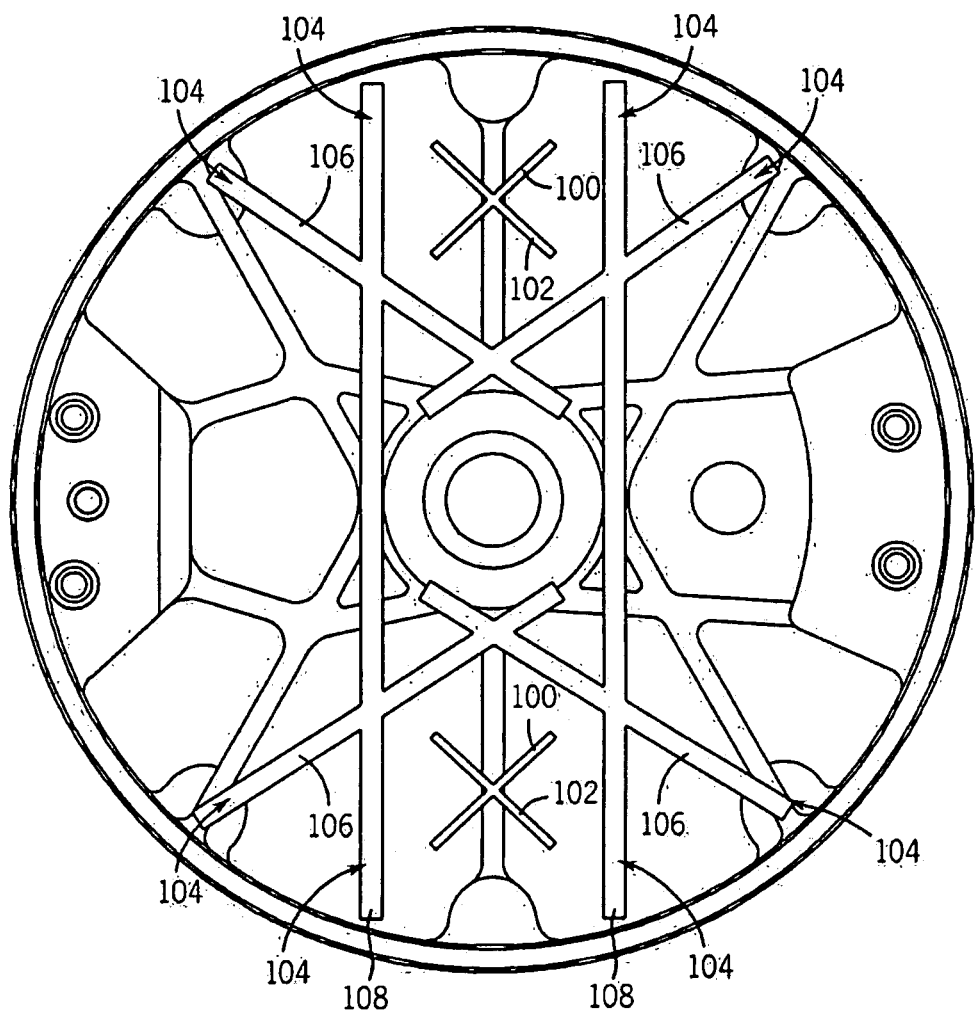
FIGS. 2A-2B show the flywheel of FIGS. 1 and 2 having various rib configurations in schematic form, in accordance with at least some alternate embodiments of the present invention.
Figure 2B:
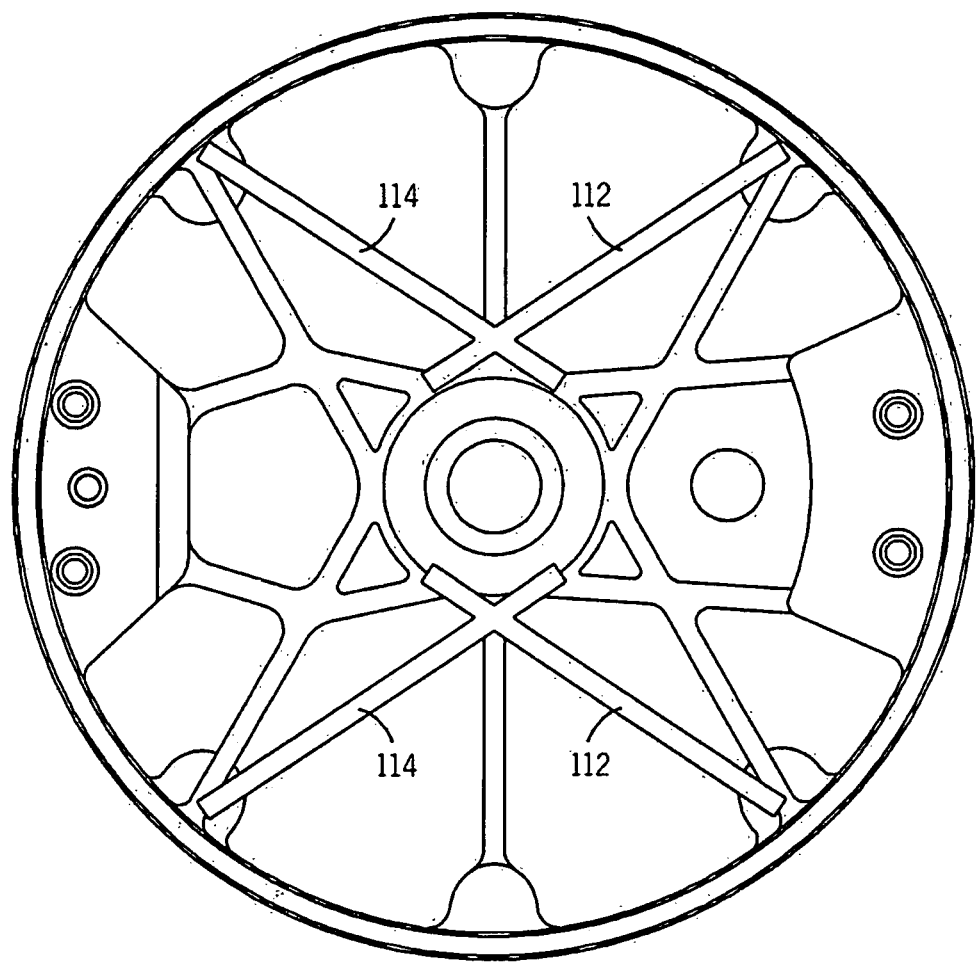

The embodiments discussed above in FIGS. 1 and 2 are exemplary in nature. For example, the support ribs 26 can include tangential ribs 28 and radial ribs 30 having various locations and/or orientations. More specifically, FIGS. 2A-2B schematically illustrate some alternative embodiments of the flywheel of FIGS. 1-2. For ease of understanding, the variations are shown using lines that are placed or printed in overlay fashion with respect to the flywheel 2 shown in FIGS. 1 and 2.

With specific reference now to FIG. 2A, in conjunction with FIG. 2, the radial ribs 30 (FIG. 2) have been removed as shown schematically by "X" lines 100 and 102. Lines 104 are representative of newly positioned or located tangential ribs 28 (FIG. 2). In particular, lines 106 represent the outer tangential ribs 31 (FIG. 2) and the lines 108 represent the inner tangential ribs 33 (FIG. 2). For example, each of the lines 106 that form a V or a substantially V-shaped configuration can extend from the inner lip portion 14 (FIG. 2) (e.g., from a point of contact of the outer ribs 31 of FIG. 2) of the outer rim 10 (FIG. 2) to the inner hub portion 16 (FIG. 2) (e.g., to a point that is in contact with the radial ribs 30 that can be removed in the embodiment of FIG. 2A). Similarly, the lines 108 can extend from one side of the inner lip portion 14 (FIG. 2) of the outer rim 10 (FIG. 2) at a tangent to the inner hub portion 16 (FIG. 2) to the other side of the inner lip portion. Additionally, the lines 106 and 108 are located and oriented in a manner that the lines intersect with one another at a point 35 (See. FIG. 2).

Further, it will be noted that in at least some embodiments, and as shown, the lines 104 representing the tangential ribs are in addition to the tangential ribs 28 described above with respect to FIGS. 1 and 2, although in other embodiments, this need not be the case. Rather, the newly added lines 104 can replace one or more of the tangential (or radial) ribs 28 (or 30).

Now, with reference to FIG. 2B, in conjunction with FIG. 2, two pairs of lines 112 and 114 flanking the radial ribs 30 (FIG. 2) on both sides, and representative of the tangential ribs 28 (FIG. 2) can be present. For example, each pair of the lines 112 and 114 can be arranged and/or oriented such that a V or a substantially V-shaped configuration can be formed by lines 112 and 114, on both sides of the radial ribs 30 (FIG. 2). Particularly, the lines 112 and 114 can extend from the inner lip portion 14 (FIG. 2) (e.g., from a point of contact of the outer ribs 31 of FIG. 2) of the outer rim 10 (FIG. 2) of the flywheel to the inner hub portion 16 (FIG. 2), for example, to a point that is in contact with the radial ribs 30 shown in FIG. 2. Further, similar to the lines 104, the lines 112 and 114 are in addition to the tangential ribs 28 and the radial ribs 30 of FIGS. 1 and 2.

In general, and in at least some embodiments of the present invention, the radial ribs can be replaced with one or more of the tangential ribs, with the tangential ribs having an arrangement similar to that described above. In at least some alternate embodiments having the tangential ribs instead of the radial ribs, the inner tangential ribs can be formed as crossing ribs, extending at a tangent to the inner hub portion, from one side of the inner lip portion of the outer rim to the other side of the inner lip portion. In still other embodiments of the present invention, an additional set of tangential ribs can be present on either side of the radial ribs. And in at least some of those embodiments, the presence of the inner tangential ribs can also vary to convenience. It should be understood that any newly positioned or located ribs, such as those described above, will typically comprise a shape and/or external profile that is generally the same as or similar to the shape and/or profile of other support ribs in a respective embodiment of a flywheel. However, one skilled in the art will appreciate that any variations in the geometry and/or profile of the ribs in a respective flywheel which are possible and consistent with the teachings herein are considered within the scope of the present invention.

By virtue of an arrangement of the tangential and the radial ribs 28 and 30, respectively, as described above, a plurality of conduits (or recesses) 32 in the flywheel body 3 are formed. The plurality of conduits 32 typically provides additional torsional and spin strength to the flywheel 2 while aiding in casting of the flywheel. However, due to the integrally formed support ribs 26 within the flywheel 2, a light-weight flywheel is provided that, while transmitting torque also serves to reduce and/or eliminate vibrations and/or noise without requiring an external damping means. In addition, the support ribs 26 serve to reinforce the strength of the flywheel 2 thereby making the flywheel more resistant to damage and breakage. In particular, the flywheel 2 of the present invention is at least generally quieter (e.g., about two or more decibels lower) than conventional flywheels of similar construction designed with a conventional stiffening structure. Further, the support ribs 26 substantially avoid any friction between various contacting components of the flywheel assembly 62, thereby minimizing or all together eliminating at least some of the problems associated with conventional flywheel assemblies having external dampers. Additionally, the support ribs 26 provide stiffness to the flywheel 2 that serves to reduce or otherwise eliminate the vibrations and any related noise.

Figure 9A:
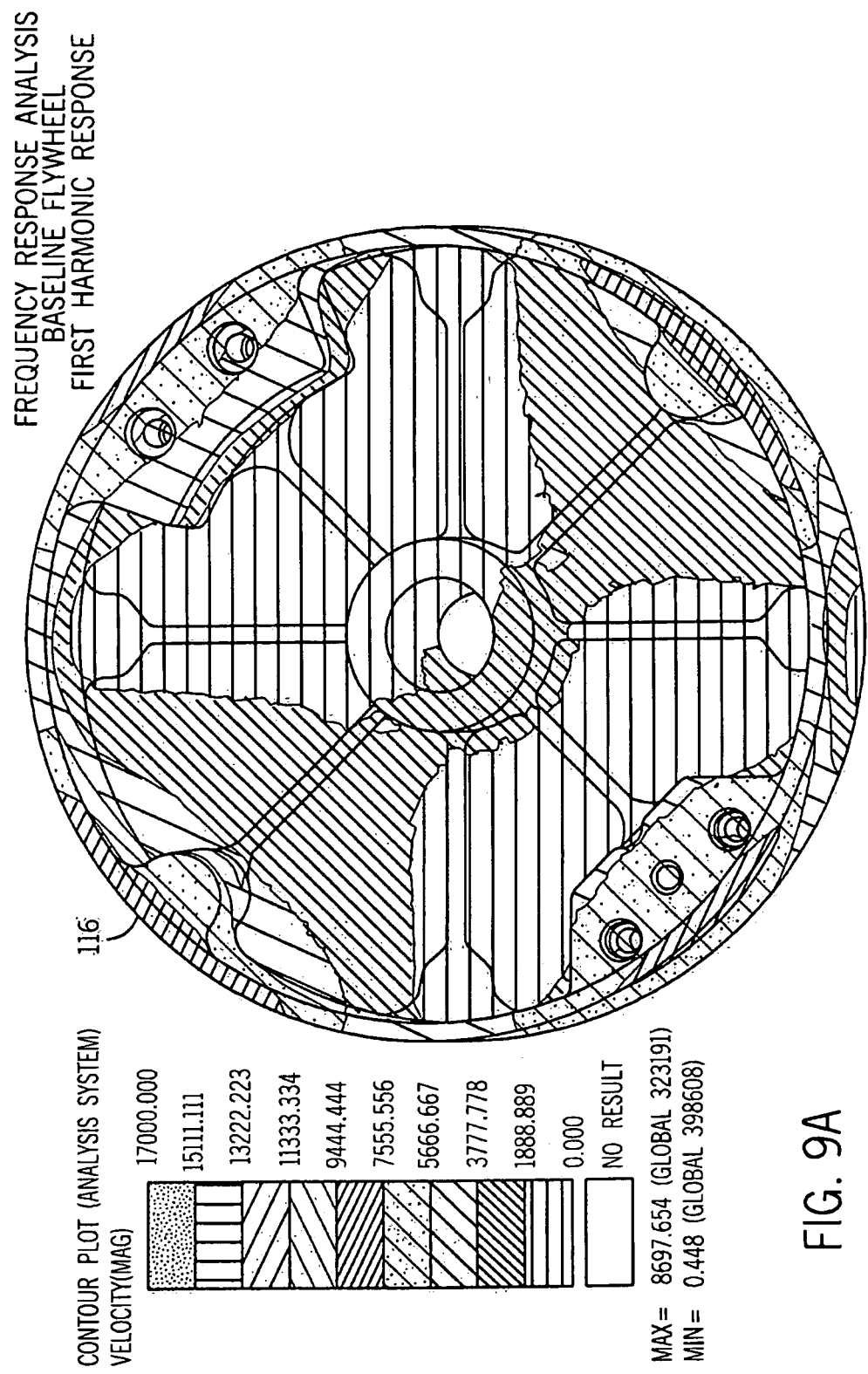
FIGS. 9A-9F provide exemplary test data and analysis results for first, second and third harmonic responses relating to a conventional flywheel and the flywheel of FIGS. 1 and 2.
Figure 9B:
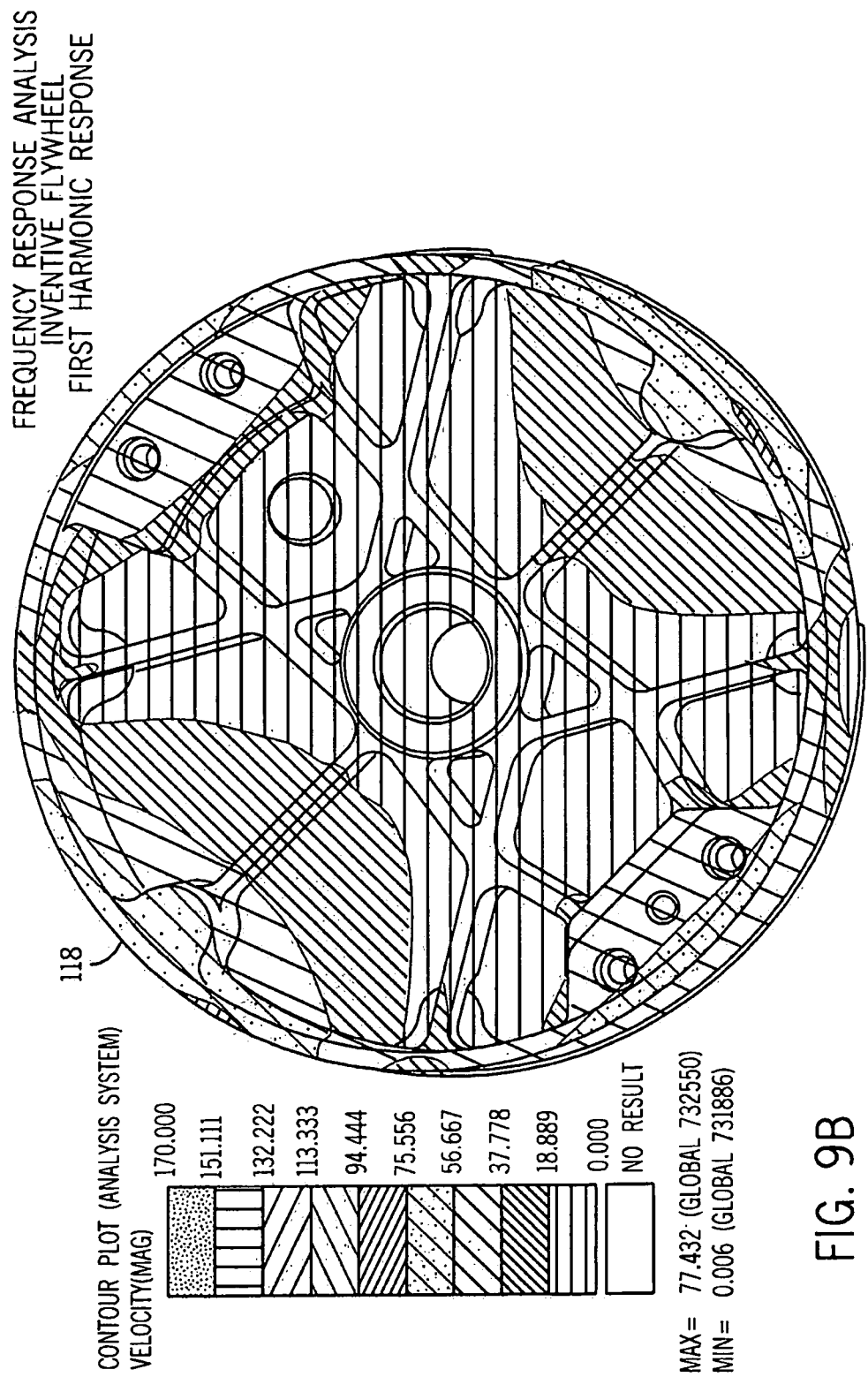
Figure 9C:
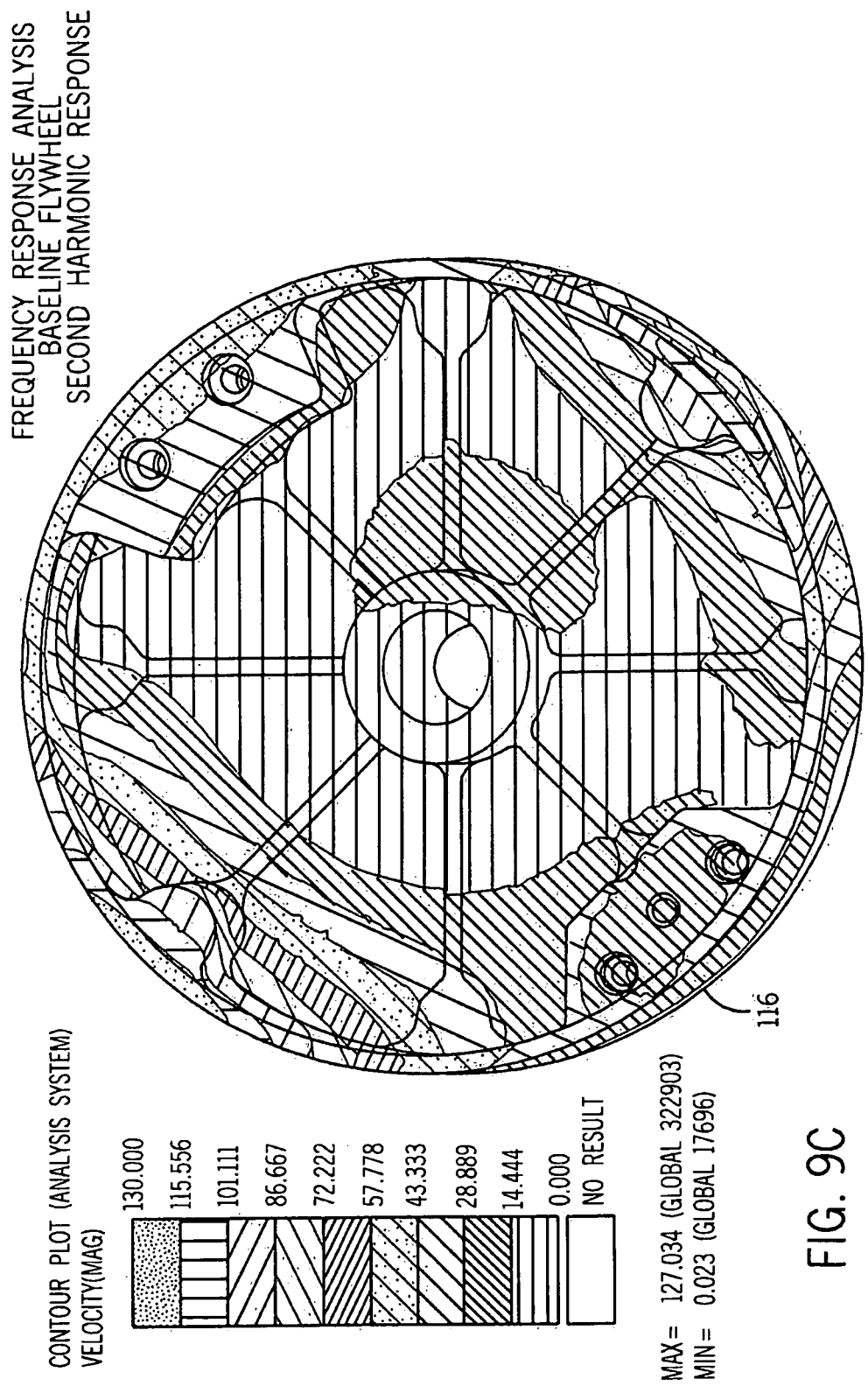
Figure 9D:
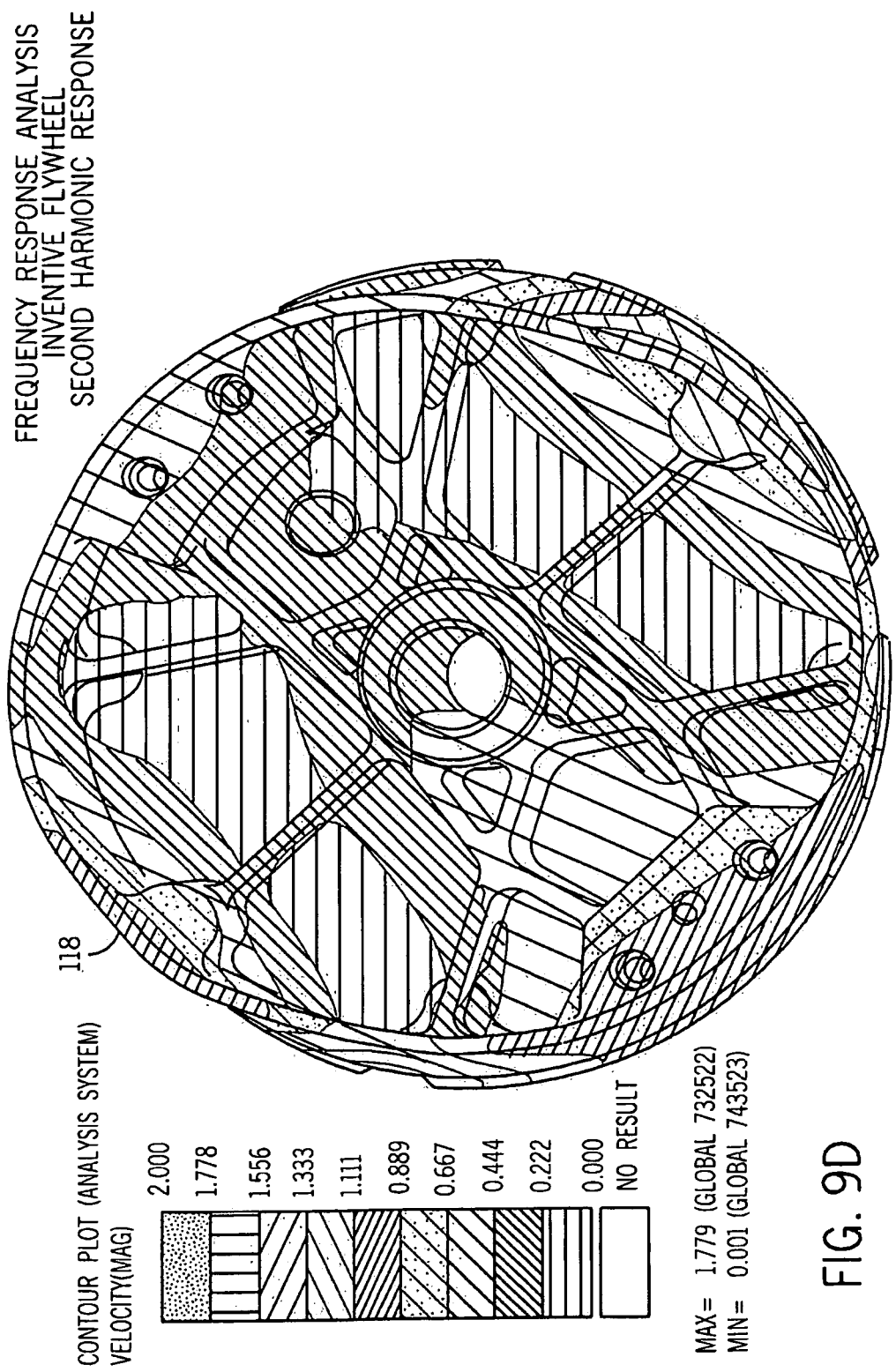
Figure 9E:
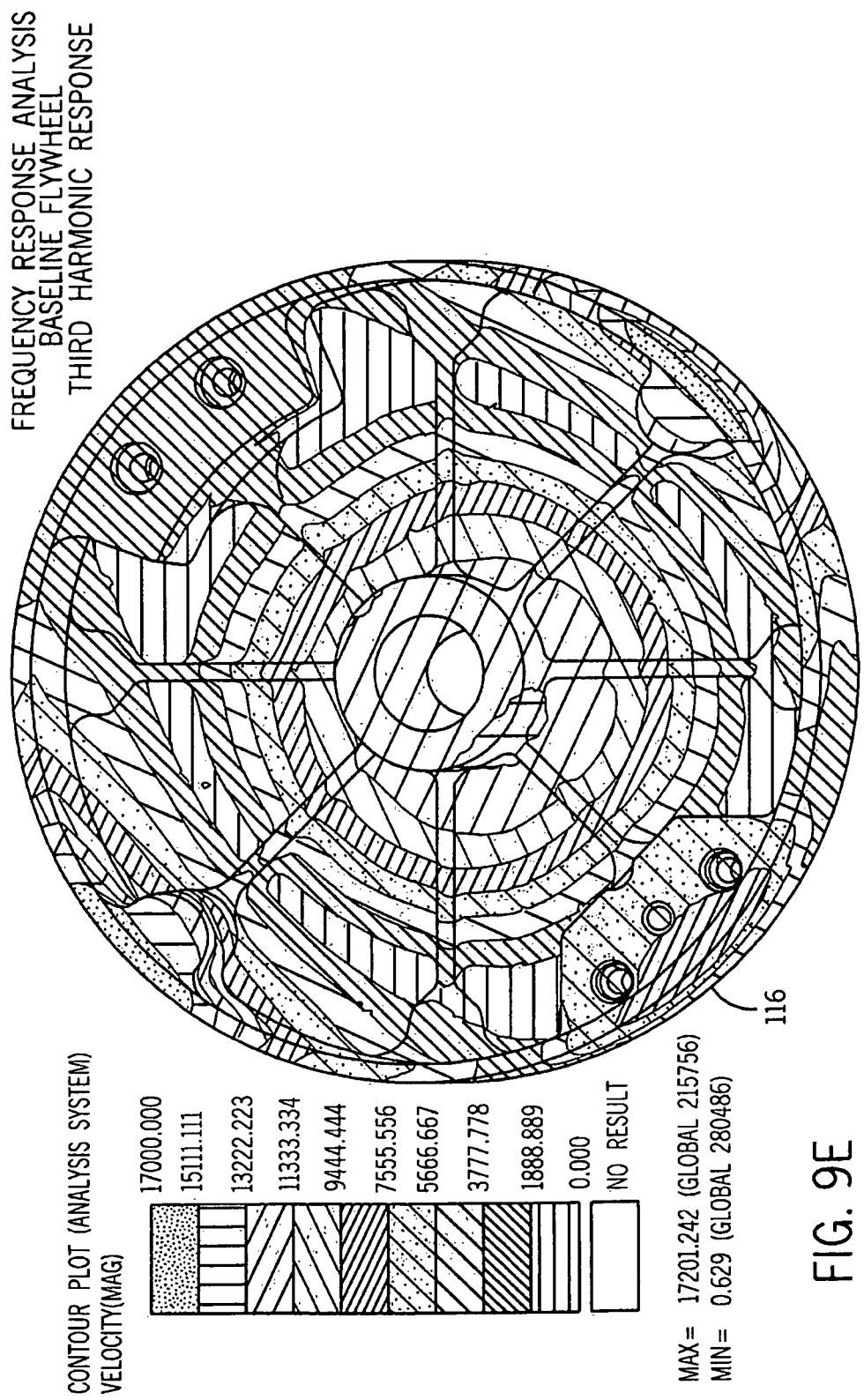
Figure 9F:
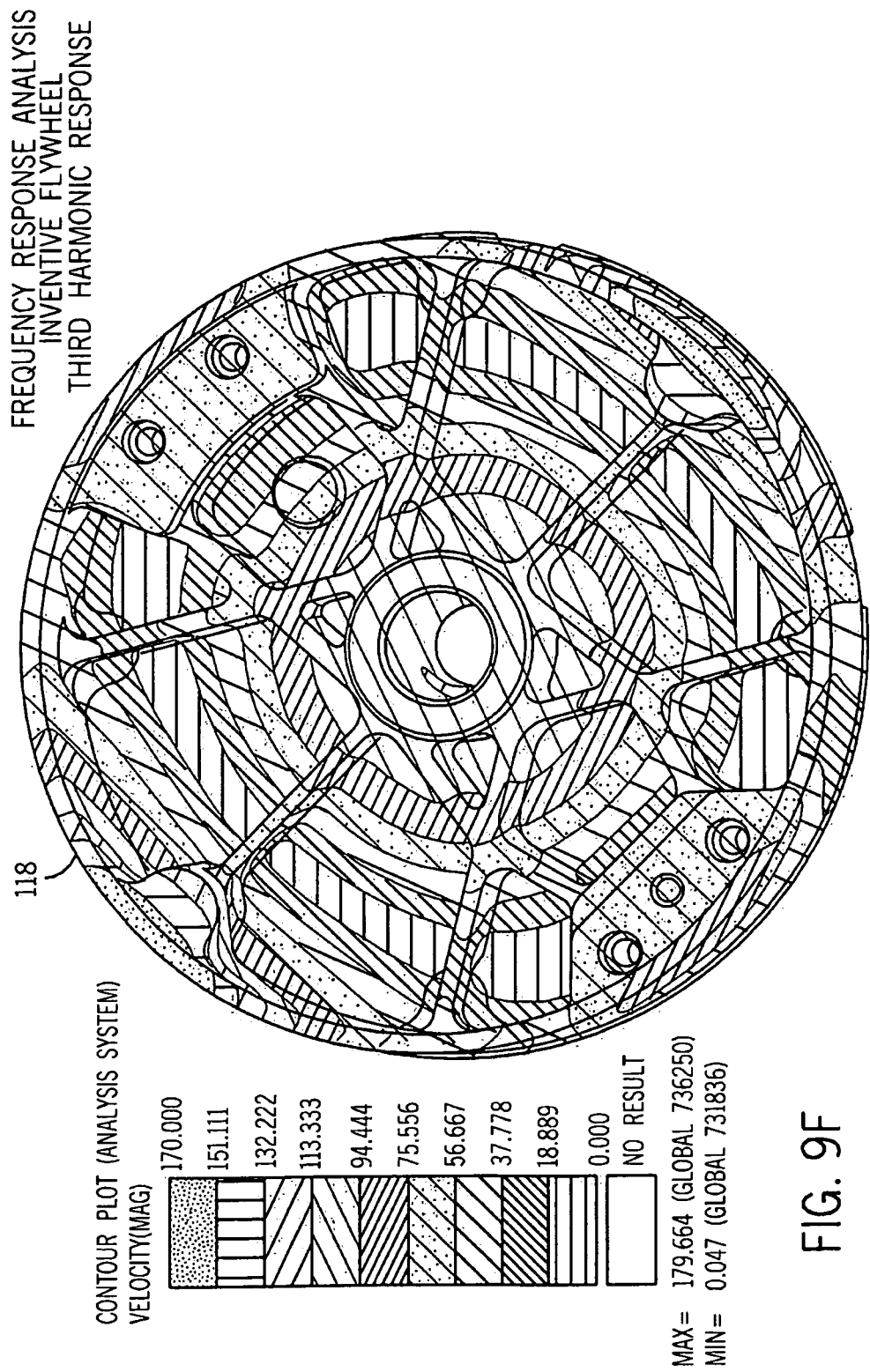

To reinforce the advantages of the support ribs 26 of the flywheel 2 in reducing and/or eliminating vibrations/noises in comparison with other conventional dampening means, FIGS. 9A-9F provide test data and analysis results relating to a conventional flywheel and the flywheel 2 and the flywheel assembly 62 of the present invention. Specifically, FIGS. 9A-9F illustrate contour plots resulting from a finite element analysis (FEA) for an exemplary conventional or "baseline" flywheel 116 and another flywheel 118, referred to as "inventive flywheel", in accordance with at least some embodiments of the present invention. The FEA analysis of FIGS. 9A-9F in particular illustrates surface velocity results for three (i.e., first, second and third) harmonic responses from a frequency response analysis (FRA) (a type of FEA). More particularly, each of the three harmonic response results is shown for both baseline flywheel 116 and inventive flywheel 118. FIGS. 9A-9B illustrate a first harmonic response for base flywheel 116 and inventive flywheel 118. Similarly, FIGS. 9C-9D, and 9E-9F illustrate the second and the third harmonic responses, respectively, of respective base and inventive flywheels 116 and 118. Stated another way, each of FIGS. 9A, 9C and 9E represent the results for baseline flywheel 116 and each of FIGS. 9B, 9D and 9F represent the results for inventive flywheel 118 for the same respective harmonic responses.

The FRA analysis was performed by evaluating the frequency response of baseline flywheel 116 and inventive flywheel 118 at a designated shaking force. More specifically, baseline and inventive flywheels 116 and 118, respectively, were subjected to the same modal frequency response analysis to determine the harmonic excitation of the structure from crankshaft axial forces that sweep from 300 hertz (Hz) to 4000 Hz. The results for the first three harmonic responses illustrating the maximum surface velocity and their corresponding shapes at those harmonic responses are described below with respect to FIGS. 9A-9F and 10A-10C, respectively. For purposes of this description, "surface velocity" is understood to be directly or substantially directly related to sound power and/or noise level and measured with respect to ambient air. It should be noted that the procedures for performing the FEA and the FRA analyses have not been described in detail here for conciseness of expression. Such analyses were performed a customary fashion. In addition, the terms and definitions used herein in relation to FEA and FRA analyses, unless otherwise described, are understood to take their customary meanings as would be evident to a person of skill in the art.

Specifically, the first harmonic response of the FRA analysis for baseline flywheel 116 (shown in FIG. 9A) occurred at a frequency of 1451 Hz, resulting in a surface velocity of 8699 millimeters/second (mm/sec). In comparison, the first harmonic response for inventive flywheel 118 (shown in FIG. 9B) occurred at a frequency of 2133 Hz, resulting in a surface velocity if 77 mm/sec, which is approximately a one hundred times (100×) reduction in the surface velocity when compared to the surface velocity of baseline flywheel 116. Similarly, the second harmonic response for baseline flywheel 116 (shown in FIG. 9C) occurred at a frequency of 1788 Hz to obtain a surface velocity of 127 mm/sec, while the second harmonic response for inventive flywheel 118 (shown in FIG. 9D) occurred at a frequency of 2387 Hz, resulting in a surface velocity of 1.8 mm/sec. Thus, the surface velocity (1.8 mm/sec) of inventive flywheel 118 is again approximately a one hundred times (100×) reduction in comparison with the surface velocity (127 mm/sec) of baseline flywheel 116. The third harmonic response for baseline flywheel 116 and inventive flywheel 118, shown respectively in FIGS. 9E and 9F, occurred at respective frequencies of 3138 Hz and 3933 Hz. The results of the third harmonic response analysis indicates a surface velocity of 17201 mm/sec for baseline flywheel 116 and a surface velocity of 180 mm/sec for inventive flywheel 118, which similar to the first and the second harmonic response, is again an approximately one hundred times (100×) reduction from baseline flywheel.

Accordingly, it is noted that in each of the first, second and the third harmonic responses, inventive flywheel 118 shows a significant reduction (i.e., 98-100%) in surface velocity compared to the surface velocity of baseline flywheel 116. Further, as indicated above, a reduction in surface velocity can equate or essentially be correlated to a noise-level reduction. Thus, in view of the results above, inventive flywheel 118 exhibits a significant noise reduction as compared to baseline flywheel 116. The noise reduction in the third harmonic response is the most noticeable given inventive flywheel 118 has the highest surface velocity in that response. Further, it should be noted that the deformation of inventive flywheel 118 in the second harmonic response is merely an artifact associated with a particular point within the cycle within which the data was taken. The deformation is not representative of the total harmonic response since the maximum deformation occurs at a different point in the cycle than the maximum surface velocity, which is illustrated herein. The intent of these illustrated results is to depict the maximum surface velocity and not necessarily the deformation.

Figure 10A:
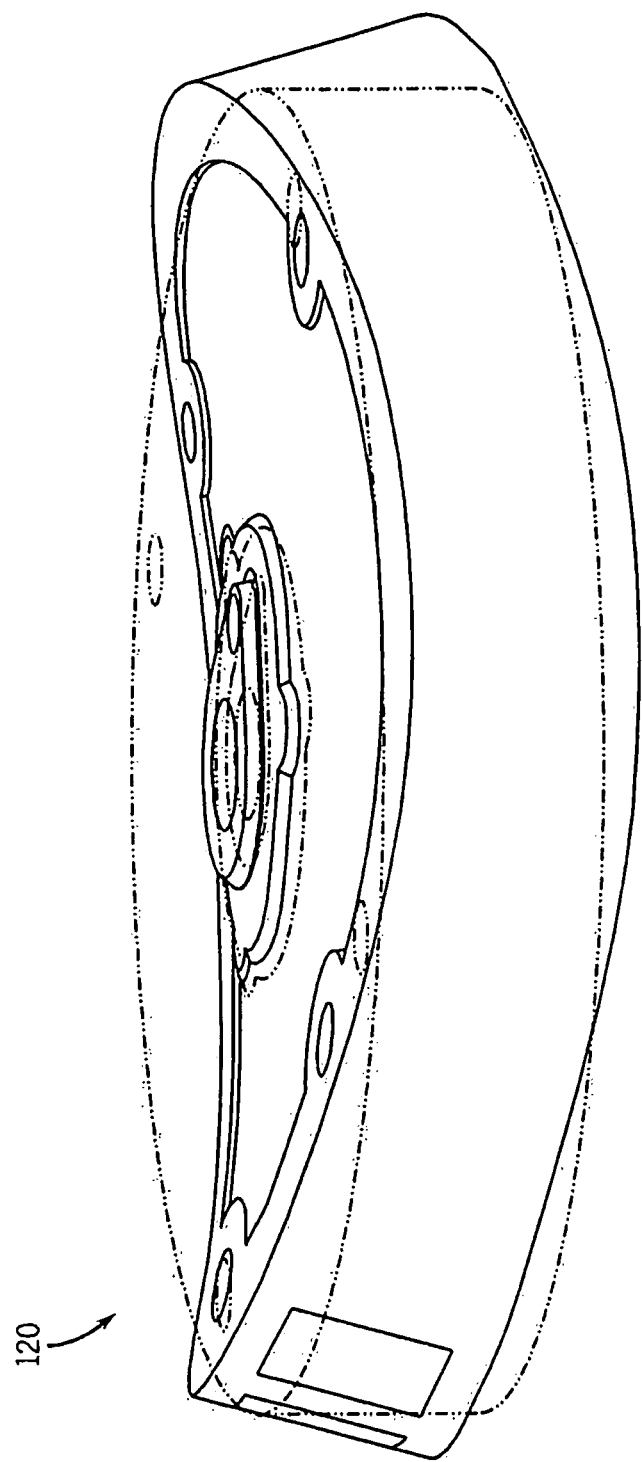
FIGS. 10A-10C show exemplary shapes corresponding to the first, second and the third harmonic responses of FIGS. 9A-9F.
Figure 10B:
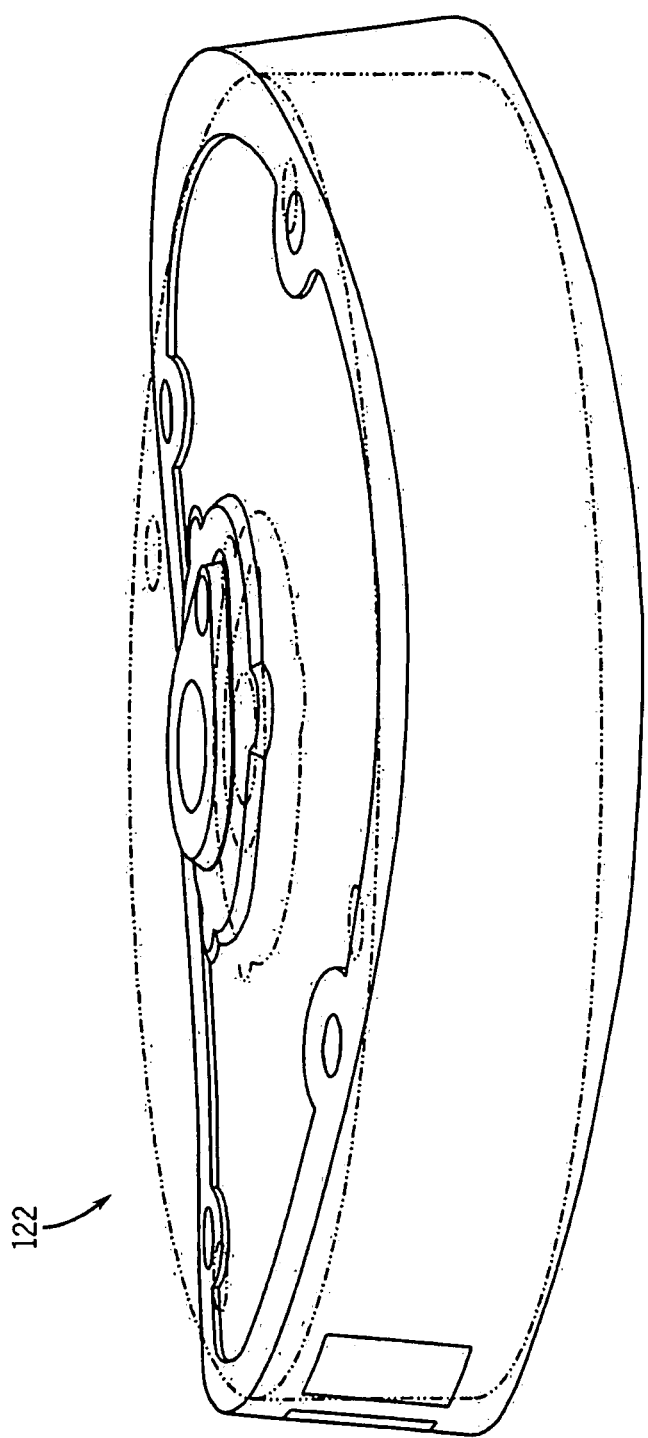
Figure 10C:
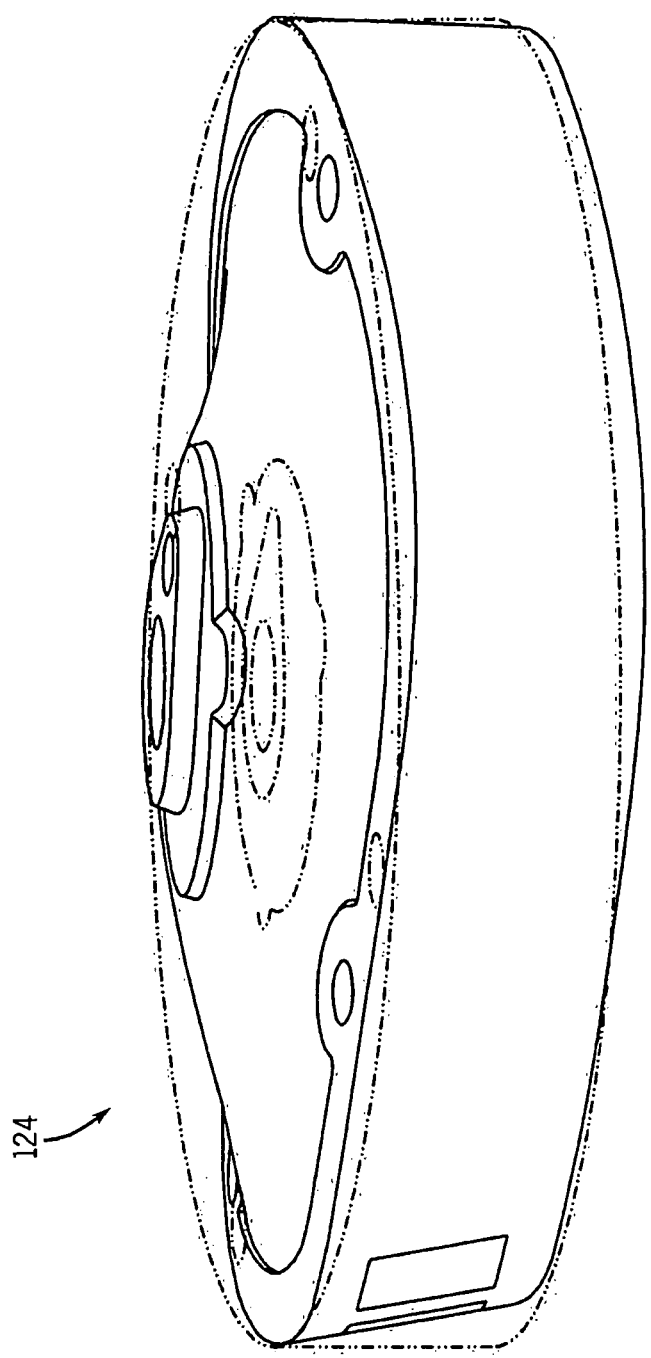

With respect to the shapes of baseline and inventive flywheels 116 and 118, respectively, in response to the first, second and the third harmonic responses, these shapes are illustrated in FIGS. 10A-10C. It should be noted that both of baseline flywheel 116 and inventive flywheel 118 assume the same or similar shape at the first, second and the third harmonic responses. Specifically, FIG. 10A shows a shape 120 corresponding to the first harmonic response of each of baseline and inventive flywheels 116 and 118, respectively, in which each of the flywheels assume a shape that comprises a parabolic or substantially parabolic profile and this shape is termed herein as "parabolic A" or "potato chip A." Relatedly, a shape 122 of baseline and inventive flywheels 116 and 118, respectively, for the second harmonic response is shown in FIG. 10B, which again comprises a parabolic or substantially parabolic profile, albeit the profile is different from the shape 120 shown in FIG. 10A. In this instance, the shape is referred as "parabolic B" or "potato chip B." FIG. 10C illustrates a third shape 124 corresponding to the third harmonic response for each of baseline and inventive flywheels 116 and 118, respectively. Specifically, the shape of each of baseline and inventive flywheels 116 and 118, respectively, for the third harmonic response comprises an out of phase hub-ring or substantially hub-ring profile and is termed herein as "hub-ring out of phase." The shape 124 is such that it would directly radiate noise.

Figure 8A:
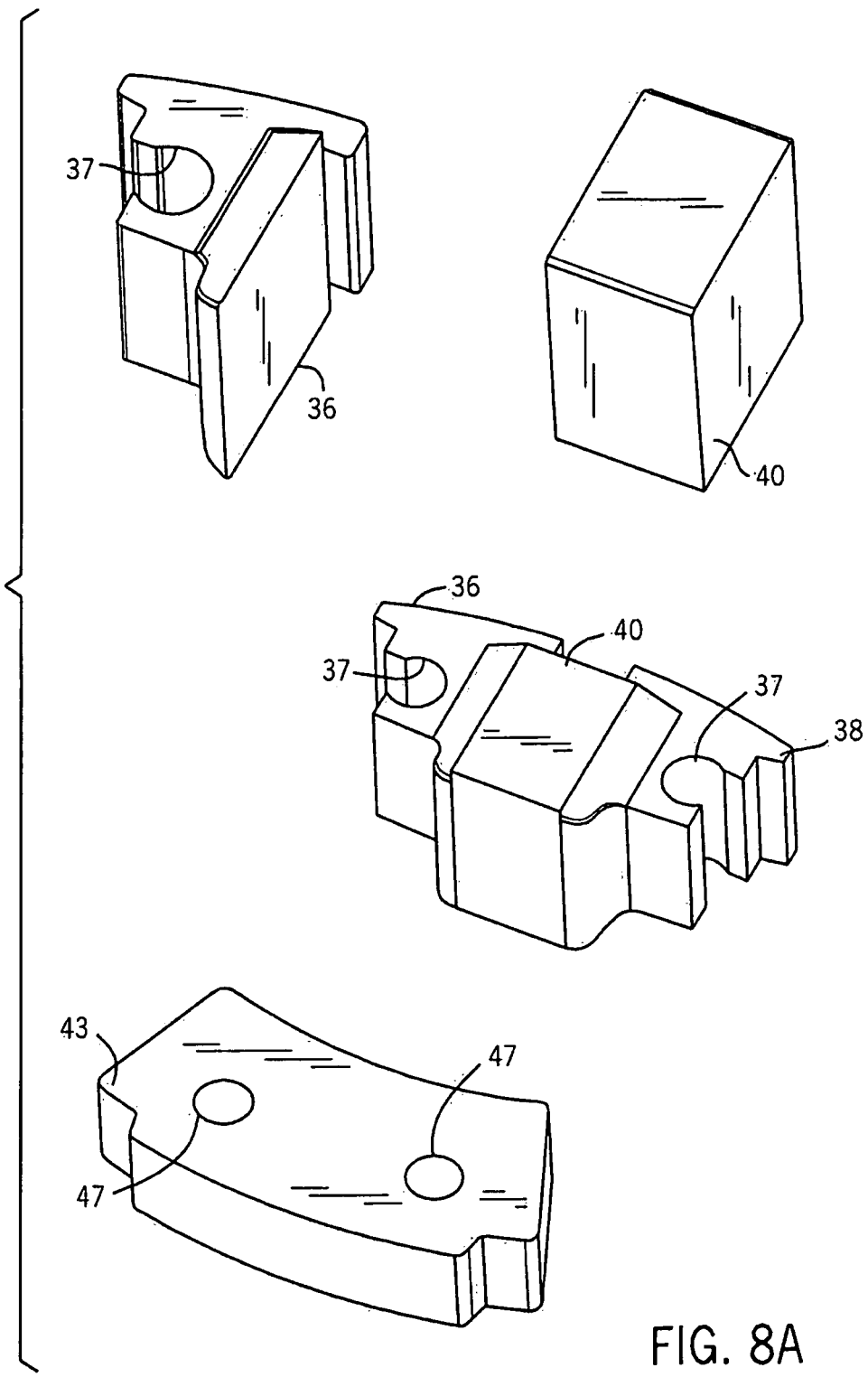
FIG. 8A shows exemplary embodiment(s) of a magnetic group that can be utilized with the flywheel of FIGS. 1 and 2, in accordance with at least some embodiments of the present invention.
Figure 8B:
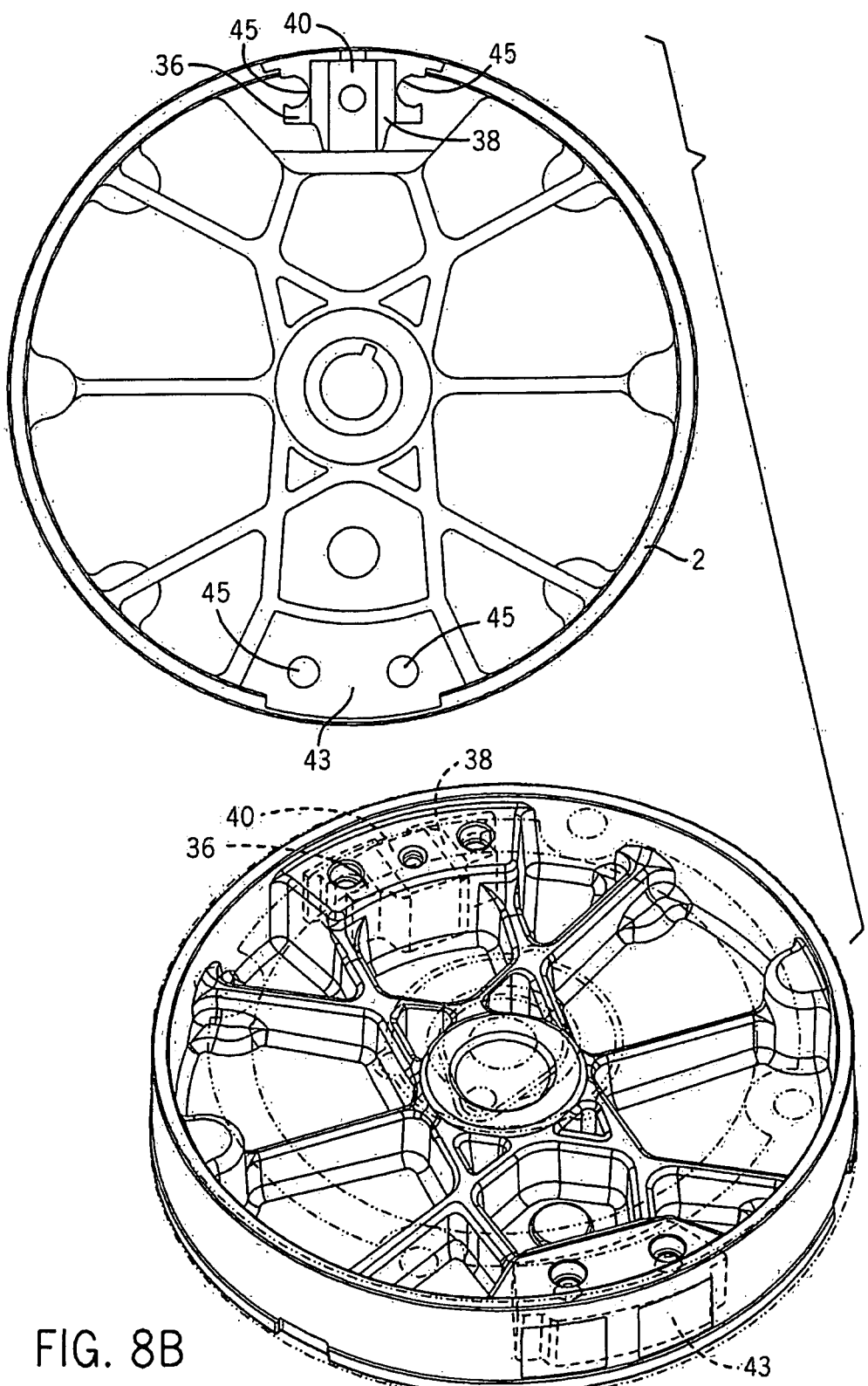
FIG. 8B shows various views of an exemplary flywheel, including a view shown in phantom, incorporating the magnetic group of FIG. 8A.

Turning back to FIGS. 1 and 2 and referring further to FIGS. 8A and 8B, the flywheel 2 additionally includes a magnetic group formed integrally within the section 34 of the flywheel body 3. In general, the rotation of the magnetic group (by virtue of rotation of the flywheel 2) induces a voltage in the ignition system of internal combustion engine employing a magnetic ignition system. In at least some embodiments of the present invention, the magnetic group formed within the section 34 of the flywheel body 3 includes first and second pole-pieces (also referred herein as pole-shoes or ignition magnet pole pieces) 36 and 38, respectively, positioned at opposing ends of a permanent (or ignition) magnet 40. In particular, in at least some embodiments of the present invention, the pole-pieces 36 and 38 can be located diametrically opposite to one another (e.g., 180 degrees apart from one another) along the inner lip portion 14 of the outer rim 10 of the flywheel 2, while the permanent magnet 40 can be positioned in between the pole-pieces (e.g., 90 degrees apart from the pole-shoes) to form a magnetic group. In at least some other embodiments of the present invention, the pole-shoes 36 and 38 flank the permanent magnet 40 such that the pole shoes are assembled as mirror images about a centerline (not shown) of the permanent magnet. Additionally, the permanent magnet 40 is oriented such that the centerline of the permanent magnet goes (e.g., extend) through the centerline of the flywheel 2. In alternate embodiments, arrangements other than those described above are contemplated.

The magnetic group (e.g., the assembled pole pieces 36 and 38, and the permanent magnet 40) can be assembled onto the section 34 of the flywheel 2. Specifically, the magnetic group can be assembled onto the flywheel in a variety of manners including, for example, cast in, bolted in or pressed in. Exemplary assemblies of the magnetic group that are cast into the flywheel 2 are shown in FIGS. 1, 2 and 8B. To facilitate casting of the magnetic group, each of the pole pieces 36 and 38 is equipped with at least one locating pin 37 such that upon casting, the material (e.g., aluminum) of which the flywheel 2 is constructed flows around the locating pins to hold the magnetic piece in position. Typically, upon completion, voids (e.g., voids 45) are formed in position of the locating pins 37. In alternate embodiments, other means, methods and/or mechanisms can be employed to operatively assemble the magnetic group onto or with respect to the flywheel.

Insofar as the pole-shoes 36 and 38 and the permanent magnet 40 are arranged as described above, rotation of the flywheel 2 causes the pole-shoes to produce a magnetic field that induces a voltage in the ignition system of the internal combustion engine. The operation of the magnetic group for generating magnetic fields is commonly known, and, is therefore, not explained here for conciseness of expression.

The permanent magnet 40 is generally formed from a high strength rare earth or non-rare earth magnetic material, such as, samarian-cobalt, aluminum-nickel-cobalt and strontium and barium ferrite. Nevertheless, other materials capable of providing a high energy permanent magnet can be used in other embodiments. Relatedly, the pole-pieces 36 and 38 are formed from a ferromagnetic material including, for example, a steel alloy, iron, nickel and cobalt. Other ferromagnetic materials can be used as well in alternate embodiments. Additionally, in at least some other embodiments, electromagnets can be used instead of the permanent magnets of the present embodiment.

Further, although not shown, at least some other embodiments of the present invention can include an additional ring gear having a plurality of teeth, which can be press-fitted around the outer lip portion 12 of the outer rim 10. The passing of the teeth of the ring gear past one or more sensing components located along side the ring gear as the flywheel 2 rotates can be used to generate magnetic signals for ignition timing purposes. Further yet, in at least some embodiments employing the ring gear, the non-dimensionalized assembled thickness ratio of the outer rim 10 can be measured by calculating the ratio of the diameter of the outer lip portion 12 to the outer diameter of the ring gear. Further, in at least some such embodiments, the non-dimensionalized assembled thickness ration can be greater than 0.8, although this need not always be the case. Rather, in alternate embodiments employing the ring gear, the non-dimensionalized assembled thickness ratio can be less than or equal to 0.8.

In addition to the various components described above in FIGS. 1 and 2, as shown additionally in FIGS. 8A and 8B, the flywheel 2 includes a counter balance weight (or counter weight) 43 integrally formed within the section 41 of the flywheel body 3. Typically, the counter balance weight 43 is provided diametrically opposite to the section 34 for maintaining balance of the flywheel 2 during rotation. Similar to the magnetic group, the counter weight 43 can be cast in, bolted in or pressed in for holding the counter weight into position within the flywheel 2. Additionally, the counter weight 43 is equipped with locating pins 47 that serve to facilitate casting in of the counter weight into the flywheel. In at least some embodiments, and typically, the masses of the magnets (e.g., the pole pieces 36, 38 and the permanent magnet 40) within the magnetic group and the counter weight 43 are roughly the same to maintain the balance of the flywheel 2. However, in some other embodiments, the mass of the counter weight 43 can be slightly higher than the mass of the magnetic group.

Figure 3:
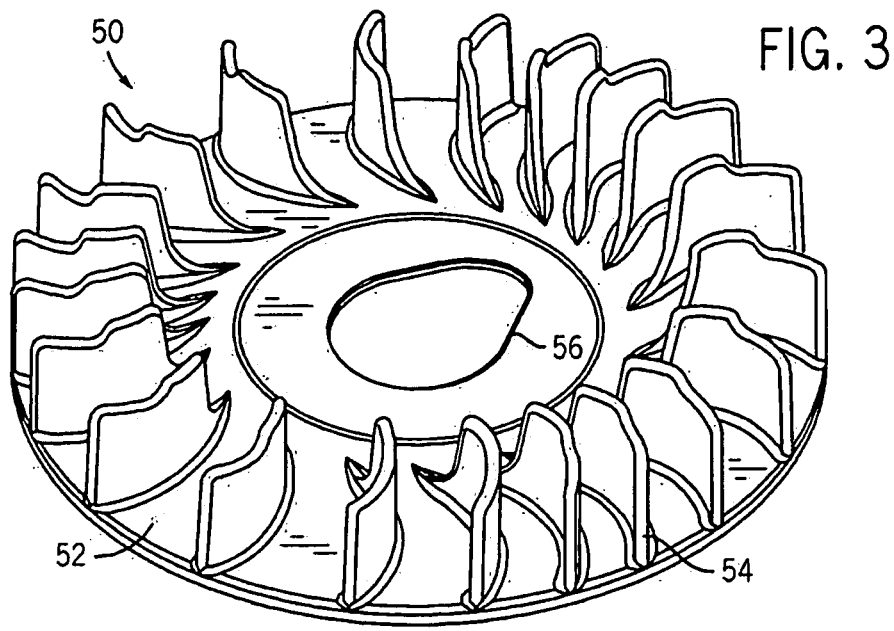
FIG. 3 is a top perspective view of a cooling fan for use in conjunction with the flywheel of FIGS. 1 and 2, in accordance with at least some embodiments of the present invention.
Figure 4:
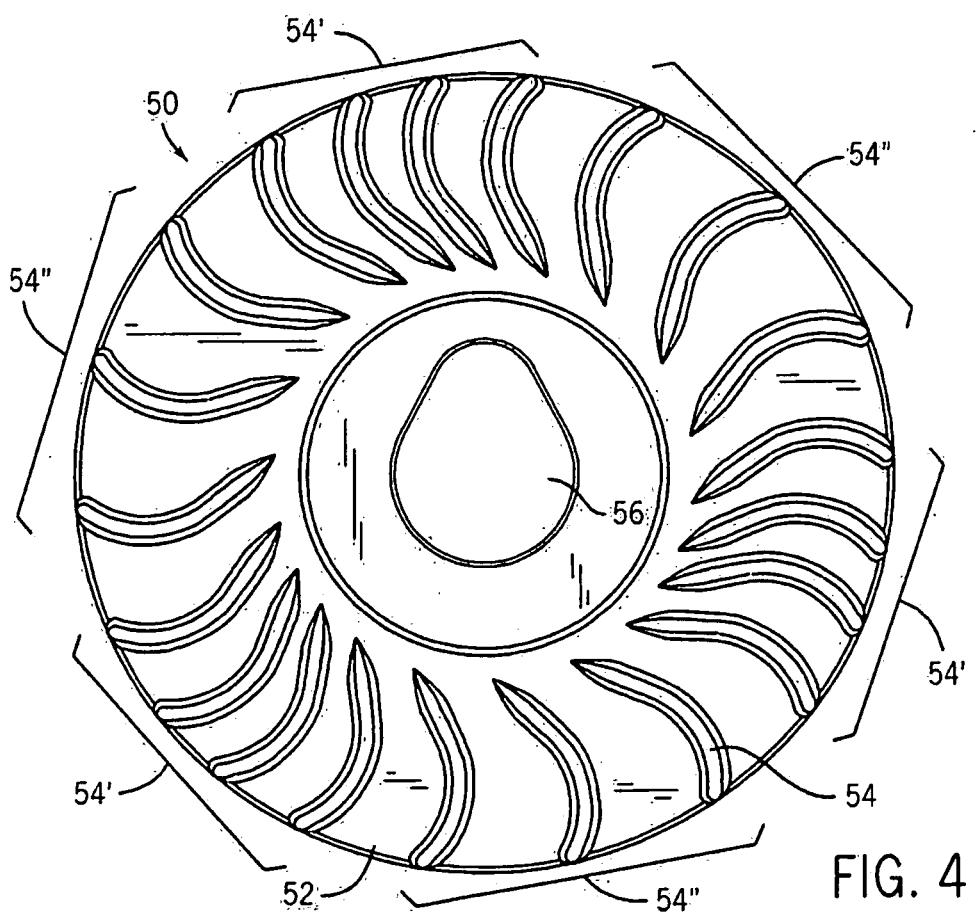
FIG. 4 is a top view of the cooling fan of FIG. 3, in accordance with at least some embodiments of the present invention.

Referring now to FIGS. 3 and 4, top views of an exemplary cooling fan 50 are shown, in accordance with at least some embodiments of the present invention. The cooling fan 50 is capable of mounting over the flywheel 2 for rotating therewith in synchronism. Rotation of the cooling fan 50 draws in ambient air from the outside atmosphere and blows the air through the engine for removing heat dissipated within the engine. In the present embodiment, the cooling fan 50 is disk-shaped or substantially disk-shaped, having a disk-shaped (or substantially disk-shaped) base 52 and a plurality of upwardly extending blades 54, arranged along an outer periphery thereof. Typically, the diameter of the base 52 is similar or substantially similar to the diameter of the flywheel 2, although this need not always be the case. Rather, in at least some other embodiments, the base 52 of the cooling fan 50 can be smaller in size than the flywheel 2 over which the cooling fan is mounted for rotation, or potentially even bigger in some alternate embodiments.

Further, although in the present embodiment, the cooling fan 50 and the flywheel 2 are separate components, connected together in operational association, in at least some other embodiments of the present invention, the blades 54 (and therefore, the cooling fan 50) can be formed integrally over the top surface 42 of the flywheel 2. By virtue of integrating the cooling fan 50 within the surface of the flywheel 2, the assembly of the various flywheel components forming the flywheel assembly 62 can be simplified. Additionally, the support ribs 26 and the stiffness of the flywheel 2 resulting therefrom, can potentially be used for reducing and/or eliminating vibrations (and related noise) occurring due to the rotation of the cooling fan 50. Nonetheless, the reduction and/or elimination of the vibrations and the associated noise may not reach the optimum noise reductions.

Further, in alternate embodiments of the present invention, the cooling fan 50 is a single piece of construction, with the blades 54 formed integrally with the base 52. Nevertheless, in other embodiments, the blades 54 and the base 52 can be separate pieces connected together in operational association by way of a wide variety of fasteners including, for example, rivets, bolts, and possibly adhesives. Fasteners other than those described above can also be used. Additionally, the material of the cooling fan 50 can vary. For example, in the present embodiment, to provide a light-weight flywheel assembly, the cooling fan 50 (including the base 52 and the blades 54), is made out of a plastic material. Notwithstanding the fact that in the present embodiment a plastic material is used, in other embodiments, other rigid materials including metals such as stainless steel and cast iron can be used in the manufacturing of the cooling fan 50.

With respect to the base 52, an oblong-shaped (or substantially oblong-shaped) opening 56 is formed in a central or a substantially central portion of the base for rotatably mounting the cooling fan 50 over the flywheel 2. Additional mechanisms on the cooling fan 50, described below, can be utilized for providing a tight fit of the cooling fan over the top surface 42 of the flywheel 2. Referring to FIG. 5 in conjunction with FIGS. 3 and 4, the top surface 42 of the flywheel 2 is shown in accordance with at least some embodiments of the present invention. In particular, the top surface 42 extends above, and covers over, all of the support ribs 26, the inner hub portion 16, the outer rim 10 as well as any spaces therebetween including the conduits 32.

As further shown in FIG. 5, the top surface 42 includes an oblong-shaped or substantially oblong-shaped protrusion 44 formed in a central or substantially central portion thereof. Also provided is an axially extending complementary orifice 46 formed within a central or substantially central portion of the oblong-shaped or substantially oblong-shaped protrusion 44, and a plurality of complementary dimples 48 along an outer periphery of the top surface 42. Typically, the complementary orifice 46 is a continuous tapering extension of the tapering orifice 18 formed on the underside surface of the flywheel body 3. However, in other embodiments, this need not be the case. Rather, in at least some other embodiments of the present invention, the complementary orifice 46 can be a separate orifice from the orifice 18. Additionally, the complementary dimples 48 formed along the outer periphery of the top surface 42 are formed within the bosses 29 that extend to the top surface. The oblong-shaped or substantially-oblong shaped protrusion 44, the complementary orifice 46 and the complementary dimples 48 are particularly employed for securing together various components of the flywheel assembly 62, as will be described later in the application.

Returning back to FIGS. 3 and 4, the oblong-shaped or substantially oblong-shaped opening 56 snugly fits around the oblong-shaped or substantially oblong-shaped protrusion 44 on the top surface 42 of the flywheel body 3. In addition, to maintain the cooling fan 50 in a constant rotational position relative to the flywheel 2, the base 52 of the cooling fan has formed on its underside surface a plurality of fan locating protrusions 51 (See FIG. 7). These protrusions 51 are press-fit within the complementary dimples 48 of the top surface 42 of the flywheel body 3. By virtue of providing the oblong-shaped or substantially oblong-shaped opening 56, and the plurality of protrusions 51, a secure interlock mechanism is provided for rotatably mounting the cooling fan 50 over the flywheel 2. Insofar as the interlock mechanism does not employ rivets, bolts, adhesives or other fastening means that secure the cooling fan 50 permanently to the flywheel 2, the cooling fan can be conveniently replaced without replacing the flywheel.

Figure 7:
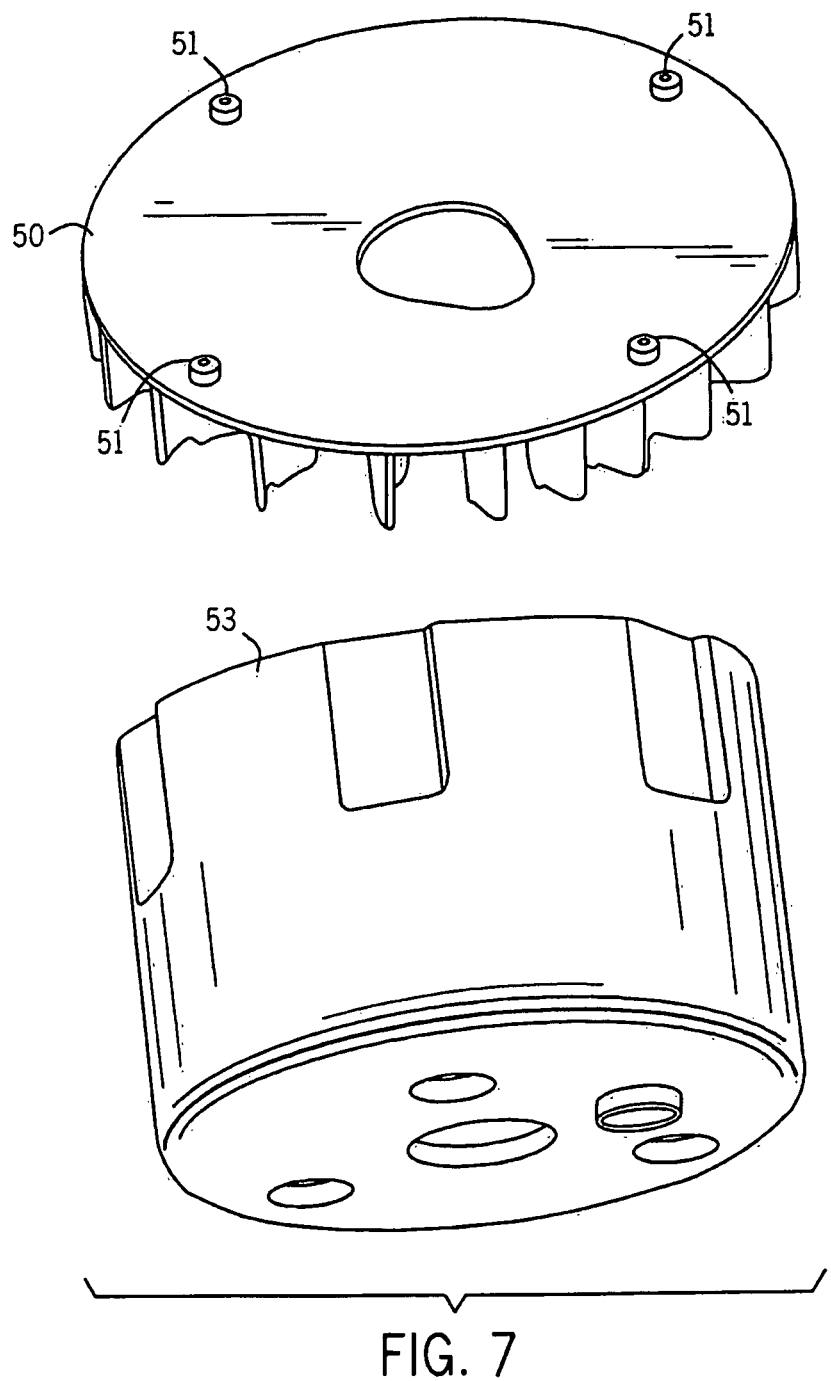
FIG. 7 shows exemplary perspective views of the cooling fan of FIG. 3 and a starter cup for operational association with the cooling fan, in accordance with at least some embodiments of the present invention.

Referring still to FIGS. 3 and 4, and additionally to FIG. 7, a starter cup 53 is positioned over the cooling fan 50 to further secure (e.g., by press-fitting) the cooling fan in position over the crankshaft 4 such that the torque from the starter cup is transferred to the flywheel 2 through the cooling fan 50 via friction at the interface between the starter cup and the flywheel. Thus, by frictionally securing and driving the cooling fan 50 with the flywheel 2, the blades 54 direct cooling air over the engine, as indicated above. In particular, as the flywheel 2 rotates about the axis of the crankshaft 4, the rotational movement of the cooling fan 50 about that axis causes the blades 54 to circulate air about the engine for cooling purposes. Typically, the blades 54 rotate at a single frequency about the axis of the flywheel and the crankshaft. Rotation of the cooling fan 50 at a single frequency generates undesirable noise that is at least indirectly related to the rotational speed of the flywheel 2. To improve the sound quality of the cooling fan 50, each of the blades 54 of the cooling fan are angularly positioned, with some blades being spaced closer to one another in comparison with other blades that are farther away from one another. For example, FIG. 4 illustrates three subsets 54' of four blades each, that are closely spaced, and three subsets 54" of three blades each that are farther away as compared to the three subsets 54'.

By virtue of an arrangement of a subset of blades closer to one another compared to another subset, the noise generated by the cooling fan 50 during rotation is split into multiple frequencies, thereby generating noises that are mixed with other engine noises making the overall noise less objectionable. Therefore, by virtue of angularly arranging the blades 54 around the outer periphery of the base 52 in an arrangement described above, the cooling fan 50 provides another source of noise reduction in conjunction with the support ribs 26 of the flywheel 2. Although, in the present embodiment, each subset 54' of the blades 54 includes four blades while each subset 54" includes three blades, it is nevertheless an intention of this invention to include embodiments having more or less than the number of blades indicated above in each subset.

Referring to FIGS. 5 and 6, exploded and assembled views, respectively, of a flywheel system 61, including the flywheel assembly 62 in operational association with the crankshaft 4 of the crankcase 6 is shown, in accordance with at least some embodiments of the present invention. As shown in FIG. 5, the flywheel 2 is secured to the crankshaft 4 for rotation along the axial axis of the crankshaft by press-fitting the flywheel to the crankshaft in the manner described above. Over the flywheel 2, the cooling fan 50 is secured for rotation in synchronism with the flywheel and the crankshaft, along the axial axis thereof. In particular, the cooling fan 50 can be mounted by designing the oblong-shaped or substantially-oblong shaped opening 56 as a clearance fit. In other embodiments, the press fit mechanism can be used as well.

Further, to secure the flywheel 2 and the cooling fan 50 axially in position relative to the crankshaft 4, a drive cup 64 and a retaining nut 66, are provided. The drive cup 64 is held in constant rotational position relative to the flywheel 2 and thus to the crankshaft 4 insofar that the drive cup rests onto the oblong-shaped or substantially oblong-shaped protrusion 44 of the top surface 42 extending through the cooling fan 50. Additionally, the drive cup 64 includes a pin-shaped protrusion (not shown) that extends into the complementary orifice 46 of the oblong-shaped or substantially oblong-shaped protrusion 44 for adjusting the alignment of the flywheel 2 and the cooling fan 50.

The retaining nut 66 then holds the drive cup 64, the cooling fan 50 and the flywheel 2 in position relative to the crankshaft 4 when the flywheel is assembled onto the crankshaft by engaging with the pin-shaped protrusion of the drive cup. Finally, axial pressure applied to the overall assembly of the drive cup 64, the cooling fan 50 and the flywheel 2 by the retaining nut 66 further reinforces the various connections among those components, thereby maintaining the rotational positions of the various components relative to one another and to the crankshaft. Notwithstanding the fact that in the present embodiment, a retaining nut is used for securing the flywheel assembly onto the crankshaft, in other embodiments, rivets, bolts and/or other fastening and engaging means can be employed. The assembled flywheel system 61 showing the flywheel assembly 62, as assembled over the crankcase 6, is shown in FIG. 6. As shown, the drive cup 64 is positioned over the cooling fan 50, which in turn is positioned over the flywheel 2. The flywheel is additionally mounted for rotation over the crankshaft 4.

By virtue of the features and components of the flywheel 2 described above, the present invention provides a light weight flywheel structure capable of providing excellent noise dampening capabilities. Notwithstanding the above-described embodiments of FIGS. 1-6, the present invention is intended to encompass a variety of other arrangements of the flywheel 2, the cooling fan 50 and components thereof. It is contemplated that the present invention can be used for a wide variety of applications, either, in conjunction with, or without, an internal combustion engine. While a typical flywheel of the kind that can be used in the present invention has been described above, the present invention is intended to encompass a wide variety of additions and/or refinements including, for example, a recoil starter mechanism, blower housing, and a screen for protecting the flywheel. Components other those mentioned above can be present in alternate embodiments.

Also, it is contemplated that embodiments of the present invention are applicable to engines that have less than one liter in displacement, or engines that both have less than one liter in displacement and fit within the guidelines specified by the above-mentioned regulations. In still further embodiments, the present invention is intended to encompass other small engines, large spark ignition (LSI) engines, and/or other larger (mid-size or even large) engines.

Further, the shape, size, material and orientation of the various features can vary from one embodiment to another. For example, more than ten support ribs can be used in other embodiments, with the orientation of those support ribs varying from that described above. As another example, the shapes, sizes and pole orientations of the permanent magnet and the pole-shoes can vary. In at least some embodiments of the present invention, the magnetic group need not be integrated into the surface of the flywheel. Rather, separate magnets and pole pieces can be mounted to the flywheel by way of pins, rivets, bolts, adhesives or any other retaining means.

It is specifically intended that the present invention not be limited to the embodiments and illustrations contained herein, but include modified forms of those embodiments including portions of the embodiments and combinations of elements of different embodiments as come within the scope of the following claims.

We claim:

1. A flywheel comprising:
   a flywheel body for rotational association with a crankshaft of an internal combustion engine, the flywheel body having an inner hub portion, an outer rim portion, a plurality of support ribs extending from the inner hub portion to the outer rim portion, and a conduit formed in the flywheel body between or substantially between the support ribs, the conduit for reducing torsional vibrations and the support ribs for reducing and/or eliminating vibrations and subsequent radiated noise;
   wherein the plurality of support ribs comprise: (i) a set of straight tangential support ribs extending at least substantially tangential with respect to the inner hub portion; and (ii) a set of radial support ribs integrally joined to the set of straight tangential support ribs and extending at least substantially radially from the inner hub portion.

2. The flywheel of claim 1, wherein the set of tangential support ribs includes eight support ribs, divided into two groups of four tangential support ribs each, with each group of four tangential support ribs positioned on either side of the inner hub portion.

3. The flywheel of claim 2, wherein four support ribs in each of the two groups are arranged such that at least of (i) two of the four support ribs are arranged in a V or substantially V-shaped configuration; and (ii) two of the four support ribs are in mating alignment with the set of radial support ribs, and positioned at least substantially perpendicular with the set of radial support ribs.

4. The flywheel of claim 2, wherein the set of radial support ribs includes two support ribs that are positioned on either side of the inner hub portion, 180 degrees or substantially 180 degrees opposite to each other, and perpendicular or substantially perpendicular to the set of tangential support ribs.

5. The flywheel of claim 1, wherein the set of tangential support ribs and the set of radial support ribs intersect, stiffening the flywheel, reducing or eliminating vibrations and subsequent noise emissions; and wherein the flywheel body includes a plurality of conduits formed therein for reducing torsional vibrations.

6. The flywheel of claim 5, wherein the inner hub portion includes an orifice extending axially therefrom for receiving the crankshaft of the internal combustion engine, the orifice having a key-lock feature for securing the flywheel in rotational association to the crankshaft.

7. The flywheel of claim 1, wherein the flywheel further includes a cover extending above, and covering the inner hub portion and the outer rim portion, the cover further having (i) an oblong-shaped or substantially oblong-shaped protrusion extending upwardly therefrom, (ii) an orifice formed in a central or a substantially central portion of the oblong-shaped or substantially oblong-shaped protrusion, and (iii) a plurality of complementary dimples located along an outer periphery of the cover.

8. The flywheel of claim 1, further comprising, at least one permanent magnet and at least two pieces positioned 180 degrees or substantially 180 degrees opposite to the at least one permanent magnet, the at least one permanent magnet and the at least two pieces formed integrally with the flywheel body.

9. The flywheel of claim 1, wherein a non-dimensionalized assembled thickness ratio of the flywheel is greater than 0.8.

10. A flywheel comprising:
a flywheel body; and
a plurality of intersecting support ribs connected to and/or formed in the flywheel body, the support ribs for damping vibrations and/or noise;
wherein the plurality of intersecting support ribs further comprise (i) a first set of tangential support ribs extending at least substantially tangentially with respect to the inner hub portion; and (ii) a set of radial support ribs integrally joined to the set of straight tangential support ribs and extending at least substantially radially from the inner hub portion.

11. The flywheel of claim 10, wherein the flywheel body further comprises:
a plurality of conduits formed between the plurality of interesting support ribs, the conduits for facilitating and/or providing stiffening of the flywheel body.

12. The flywheel of claim 10, wherein the plurality of intersecting support ribs further comprise (i) a first set of tangential support ribs extending at least substantially tangential with respect to the inner hub portion; and (ii) a second set of tangential ribs extending at least substantially tangential with respect to the inner hub portion and located and/or oriented at least substantially perpendicular to the first set of tangential ribs.

13. The flywheel of claim 10,
wherein the set of support ribs further includes a pair of second tangential ribs extending at least substantially tangentially with respect to the inner hub portion and flanking the set of radial ribs.

14. The flywheel of claim 10, wherein the plurality of intersecting support ribs is integrally formed in relation to the flywheel body.

* * * * *

UNITED STATES PATENT AND TRADEMARK OFFICE
CERTIFICATE OF CORRECTION

PATENT NO. : 8,714,051 B2  Page 1 of 1
APPLICATION NO. : 12/253363
DATED : May 6, 2014
INVENTOR(S) : Russell J. Dopke et al.

It is certified that error appears in the above-identified patent and that said Letters Patent is hereby corrected as shown below:

In the Claims, Claim No. 11

Column 16, line 19, replace "interesting" with --intersecting--

Signed and Sealed this
Twenty-second Day of July, 2014

Michelle K. Lee
*Deputy Director of the United States Patent and Trademark Office*